United States Patent [19]

Murayama et al.

[11] Patent Number: 4,999,790
[45] Date of Patent: Mar. 12, 1991

[54] INFORMATION FILING APPARATUS

[75] Inventors: Takashi Murayama, Gifu; Nobuaki Nii, Ogaki, both of Japan

[73] Assignee: Sanyo Electric Co., Ltd., Osaka, Japan

[21] Appl. No.: 232,925

[22] Filed: Aug. 16, 1988

[30] Foreign Application Priority Data

Aug. 19, 1987 [JP] Japan .......................... 62-125818[U]

[51] Int. Cl.⁵ .............................................. G06F 15/40
[52] U.S. Cl. .................................... 364/521; 364/518; 340/706
[58] Field of Search ....................... 364/518, 521, 522; 340/703, 706, 717, 724, 712

[56] References Cited

U.S. PATENT DOCUMENTS

| | | | |
|---|---|---|---|
| 4,601,003 | 7/1986 | Yoneyama et al. | 364/518 |
| 4,642,780 | 2/1987 | Thomson | 364/512 |
| 4,649,499 | 3/1987 | Sutton et al. | 364/518 |
| 4,707,690 | 11/1987 | Higuchi | 340/750 |
| 4,787,040 | 11/1988 | Ames et al. | 364/424.01 |
| 4,791,558 | 12/1988 | Chaitin et al. | 364/200 |
| 4,794,519 | 12/1988 | Koizumi et al. | 364/200 |
| 4,811,199 | 3/1989 | Kuechler et al. | 364/200 |
| 4,811,240 | 3/1989 | Ballou et al. | 364/518 |
| 4,876,665 | 10/1989 | Iwai et al. | 364/900 |

Primary Examiner—Dale M. Shaw
Assistant Examiner—Phu K. Nguyen
Attorney, Agent, or Firm—Darby & Darby

[57] ABSTRACT

An information filing apparatus including two keyword input units, storage for image information, keyword data and retrieval information, a display, an image information retrieval unit and an image information output unit. The image information retrieval unit retrieves image information from the image information storage based on a keyword inputted from one of the two keyword units and on information stored in the retrieval information storage. The image information output unit reads out the retrieved information and displays it on the display. One of the keyword input units is independent of the display and is used for inputting keywords. The other keyword unit enables input of a keyword selected from a displayed keyword list.

23 Claims, 33 Drawing Sheets

Fig. 10 (a)

| SHEET PAGE | X(ROW) | Y(LINE) | SERIAL NUMBER | | | | |
|---|---|---|---|---|---|---|---|
| 1 | 1 | 1 | 1 | 2 | 1 | 2 | 1 |

DATA CORRESPONDING TO ONE KEY OF MULTIPLE ITEM INPUT EQUIPMENT

Fig. 10 (b)

| KIND OF CHARACTER DATA | CHARACTER DATA | | | | | | |
|---|---|---|---|---|---|---|---|
| JIS | "PPC" | JIS | "FAX" | JIS | "WP" | JIS | |

DATA CORRESPONDING TO ONE KEYWORD

Fig. 17(a)

| INPUT | REG | RETR | PRINT | COMM | UTIL |

DISC NAME :
BINDER NAME :

SELECT
1. Demo 4
2. SOF-M90
3. M88 LASER-DISC B
4.
5.
6.
7.
8.
9.
10.
11.
12.
13.
14.
15.

EXECUTE    CANCEL

Fig. 17(b)

| INPUT | REG | RETR | PRINT | COMM | UTIL |

DISC NAME :
BINDER NAME :

SELECT
1. Demo 4
2. SOF-M90
3. M88 LASER-DISC B
4.
5.
6.
7.
8.
9.
10.
11.
12.
13.
14.
15.

EXECUTE    CANCEL

Fig. 17(c)

```
INPUT  REG  RETR  PRINT  COMM  UTIL

DISK NAME    : Demo 4
   BINDER NAME  :

PAGE-  PAGE+              SELECT
              1. Magazine
              2. cataloge
              3. manual
              4. manual 2
              5. American Magazine Ads.
              6.
              7.
              8.
              9.
             10.
             11.
             12.
             13.
             14.
   EXECUTE   15.
```

Fig. 17(d)

```
INPUT  REG  RETR  PRINT  COMM  UTIL

DISK NAME    : Demo 4
   BINDER NAME  :

PAGE-  PAGE+              SELECT
              1. Magazine
              2. cataloge
              3. manual
              4. manual 2
              5. American Magazine Ads.
              6.
              7.
              8.
              9.
             10.
             11.
             12.
             13.
             14.
   EXECUTE   15.
```

Fig. 17(e)

```
INPUT | REG | RETR | PRINT | COMM | UTIL

DISK NAME      :  Demo 4
    BINDER NAME    :  catalog

1. TITLE                    :
  2. TECHNOLOGY               :

3. H.Q.                     :

4. PRODUCTS                 :

5. CONTROL NO               : . .

EXECUTE         CANCEL
```

Fig. 17(f)

```
INPUT | REG | RETR | PRINT | COMM | UTIL

DISK NAME      :  Demo 4
    BINDER NAME    :  catalog

1. TITLE                    : Sanfile SOF-M88
  2. TECHNOLOGY               :

3. H.Q.                     :

4. PRODUCTS                 :

5. CONTROL NO               : . .

EXECUTE         CANCEL
```

Fig. 17(g)

```
┌─────────────────────────────────────────────────┐
│ INPUT│ REG │ RETR │ PRINT │ COMM │ UTIL         │
├─────────────────────────────────────────────────┤
│                                                 │
│    DISK NAME       :  Demo 4                    │
│    BINDER NAME     :  catalog                   │
│                                                 │
│   1. TITLE              :  Sanfile SOF-M88      │
│   2. TECHNOLOGY         :                       │
│                                                 │
│   3. H.Q.               :                       │
│                                                 │
│   4. PRODUCTS      ↖    :                       │
│                                                 │
│   5. CONTROL NO         : ..                    │
│                                                 │
│                                                 │
│     EXECUTE         CANCEL                      │
│                                                 │
└─────────────────────────────────────────────────┘
```

Fig. 17(h)

```
┌─────────────────────────────────────────────────────┐
│ INPUT│ REG │ RETR │ PRINT │ COMM │ UTIL             │
├─────────────────────────────────────────────────────┤
│ DISK NAME   : Demo 4       │ PAGE- │ PAGE+ │ SELECT │
│ BINDER NAME : catalog      ├────────────────────────┤
│                            │  1. TV                 │
│ 1. TITLE   :Sanfile SOF    │  2. radio              │
│ 2. TECHNOLOGY :            │  3. ppc                │
│                            │  4. fax                │
│                            │  5. computer           │
│ 3. H.Q.       :            │  6. file system   ←    │
│                            │  7. monitor            │
│                            │  8. watch              │
│ 4. PRODUCTS   :            │  9. lamp               │
│                            │ 10. fan                │
│                            │ 11. heater             │
│ 5. CONTROL NO : ..         │ 12. printer            │
│                            │ 13. recorder           │
│                            │ 14. speaker            │
│   EXECUTE      CANCEL      │ 15. telephone          │
└─────────────────────────────────────────────────────┘
```

Fig. 17(i)

```
INPUT  REG   RETR  PRINT  COMM   UTIL

DISK NAME    : Demo 4
BINDER NAME  : catalog            PAGE-  PAGE+        SELECT 1. TV
                                   2. radio
1. TITLE       : Sanfile SOF       3. ppc
2. TECHNOLOGY  :                   4. fax
                                   5. computer
                                   6. file system
3. H.Q.        :                   7. monitor
                                   8. watch
                                   9. lamp
4. PRODUCTS    :                  10. fan
                                  11. heater
5. CONTROL NO  :..                12. printer
                                  13. recorder
                                  14. speaker
 EXECUTE   CANCEL                 15. telephone
```

Fig. 17(j)

```
INPUT  REG   RETR  PRINT  COMM   UTIL

DISK NAME     :  Demo 4
    BINDER NAME   :  catalog

1. TITLE              : Sanfile SOF-M88
  2. TECHNOLOGY         :

3. H.Q.               :

4. PRODUCTS           : file system

5. CONTROL NO         : ..

EXECUTE         CANCEL
```

Fig. 17(k)

| INPUT | REG | RETR | PRINT | COMM | UTIL | |

DISC NAME :
BINDER NAME :

SELECT

1. Demo 4
2. SOF-M90
3. M88 LASER-DISC B
4.
5.
6.
7.
8.
9.
10.
11.
12.
13.
14.
15.

EXECUTE   CANCEL   DISP.LIST

Fig. 17(l)

| INPUT | REG | RETR | PRINT | COMM | UTIL | |

DISK NAME : Demo 4
BINDER NAME :

PAGE- PAGE+    SELECT

1. Magazine
2. Catalog
3. manual
4. manual 2
5. American Magazine Ads.
6.
7.
8.
9.
10.
11.
12.
13.
14.
15.

EXECUTE   CANCEL   DISP.LIST

Fig. 17(m)

| INPUT | REG | RETR | PRINT | COMM | UTIL | |

```
   DISC NAME      : Demo 4
   BINDER NAME    : catalog

1. TITLE         :
 2. TECHNOLOGY    :

3. H.Q.          :

4. PRODUCTS  ←   :

5. CONTROL NO    :..~..
```

[ EXECUTE ]   [ CANCEL ]   [ DISP. LIST ]

Fig. 17(n)

| INPUT | REG | RETR | PRINT | COMM | UTIL | |

```
DISK NAME     : Demo 4         | PAGE- | PAGE+ |     | SELECT |
BINDER NAME   : catalog          1. TV
                                 2. radio
                                 3. ppc
1. TITLE      :                  4. fax
2. TECHNOLOGY :                  5. computer
                                 6. file system  ←
3. H.Q.       :                  7. monitor
                                 8. watch
                                 9. lamp
[4. PRODUCTS] :                 10. fan
                                11. heater
5. CONTROL NO :..~..            12. printer
                                13. recorder
                                14. speaker
                                15. telephone
```

[ EXECUTE ]   [ CANCEL ]   [ DISP. LIST ]

Fig. 17(o)

```
┌─────┬─────┬─────┬─────┬─────┬─────┬──────────┐
│INPUT│ REG │▓PETR│PRINT│COMM │UTIL │          │
├─────┴─────┴─────┴─────┴─────┴─────┴──────────┤
│ DISK NAME   : Demo 4      ▓PAGE-│PAGE+│ │▓SELECT│
│ BINDER NAME : catalog      1. TV              │
│                            2. radio           │
│                            3. ppc             │
│ 1. TITLE      :            4. fax             │
│ 2. TECHNOLOGY :            5. computer        │
│                           ▓6. file system▓ ←  │
│                            7. monitor         │
│ 3. H.Q.       :            8. watch           │
│                            9. lamp            │
│                           10. fan             │
│ ▓4. PRODUCTS▓ :           11. heater          │
│                           12. printer         │
│ 5. CONTROL NO :..~..      13. recorder        │
│                           14. speaker         │
│                           15. telephone       │
│                                               │
│            ▓EXECUTE▓   ▓CANCEL▓   ▓DISP.LIST▓ │
└───────────────────────────────────────────────┘
```

Fig. 17(p)

```
┌─────┬─────┬─────┬─────┬─────┬─────┬──────────┐
│INPUT│ REG │▓PETR│PRINT│COMM │UTIL │          │
├─────┴─────┴─────┴─────┴─────┴─────┴──────────┤
│   DISC NAME    :  Demo 4                      │
│   BINDER NAME  :  catalog                     │
│                                               │
│  1. TITLE         :                           │
│  2. TECHNOLOGY    :                           │
│                                               │
│  3. H.Q.          :                           │
│                                               │
│                                               │
│  4. PRODUCTS      : file system  ←            │
│                                               │
│  5. CONTROL NO    :..~..                      │
│                                               │
│                                               │
│            ▓EXECUTE▓   ▓CANCEL▓   ▓DISP.LIST▓ │
└───────────────────────────────────────────────┘
```

Fig. 17(q)

| INPUT | REG | PETR | PRINT | COMM | UTIL | |

```
   DISC NAME    : Demo 4
   BINDER NAME  : catalog

1. TITLE         :
   2. TECHNOLOGY    :

3. H.Q.          :

4. PRODUCTS      : file system, computer

5. CONTROL NO    :..~..
```

[EXECUTE]  [CANCEL]  [DISP.LIST]

Fig. 17(r)

| INPUT | REG | PETR | PRINT | COMM | UTIL | |

```
   CASES          5
   DISC NAME    : Demo 4
   BINDER NAME  : catalog

NO.           TITLE                              PAGE
        CONTROL NO
   0001  SANYO                                      1/5
         00
   0002  *                                          1/1
         00
   0003  *                                          1/1
         00
   0004  *                                          1/1
         00
   0005  Sof m90                                    1/1
         00
```

[EXECUTE]  [CANCEL]  [DISP.LIST]  [EDIT]  [DETAIL]

Fig. 17(s)

| INPUT | REG | RETR | PRINT | COMM | UTIL | |

DEF. WORD   MAX KEYWORDS
   PRESET KEYWORDS
DISC NAME :
BINDER NAME :   SELECT

1. Demo 4
2. SOF-M90
3. M88 LASER-DISC B
4.
5.
6.
7.
8.
9.
10.
11.
12.
13.
14.
15.

EXECUTE   CANCEL   CONT. BACK

Fig. 17(t)

| INPUT | REG | RETR | PRINT | COMM | UTIL | |

DEF. KEYWORD   MAX KEYWORDS  5120
   PRESET KEYWORS  163
DISK NAME : Demo 4
BINDER NAME :

PAGE↑ PAGE↓   SELECT

1. Magazine
2. catalog
3. manual
4. manual 2
5. American Magazine Ads.
6.
7.
8.
9.
10.
11.
12.
13.
14.
15.

EXECU

Fig. 17(u)

```
┌─────┬─────┬─────┬─────┬─────┬─────┬──────────┐
│INPUT│ REG │RETR │PRINT│COMM │UTIL │          │
├─────┴─────┴─────┴─────┴─────┴─────┴──────────┤
│      DEF. KEYWORD         MAX KEYWORDS  5120 │
│                           PRESET KEYWORDS 163│
│    DISC NAME   : Demo 4                      │
│    BINDER NAME : catalog                     │
│                                              │
│  1. TITLE         :                          │
│  2. TECHNOLOGY    : *                        │
│                                              │
│  3. H.Q.          : *                        │
│                                              │
│                                              │
│  4. PRODUCTS   ↖  : *                        │
│                                              │
│  5. CONTROL NO    :                          │
│                                              │
│                                              │
│         EXECUTE     CANCEL    CONT. BACK     │
└──────────────────────────────────────────────┘
```

Fig. 17(v)

```
┌─────┬─────┬─────┬─────┬─────┬─────┬──────────┐
│INPUT│ REG │RETR │PRINT│COMM │UTIL │          │
├─────┴─────┴─────┴─────┴─────┴─────┴──────────┤
│     DEF. KEYWORD          MAX KEYWORDS  5120 │
│                           PRESET KEYWORDS 163│
│  DISK NAME   : Demo 4    ┌PAGE┬PAGE┬──┬SELECT┤
│  BINDER NAME : catalog   │ 16. solder        │
│                          │ 17.  ↖            │
│  1. TITLE      :         │ 18.               │
│  2. TECHNOLOGY : *       │ 19.               │
│                          │ 20.               │
│  3. H.Q.       : *       │ 21.               │
│                          │ 22.               │
│                          │ 23.               │
│  4. PRODUCTS   : *       │ 24.               │
│                          │ 25.               │
│  5. CONTROL NO :         │ 26.               │
│                          │ 27.               │
│  ┌──────────────────────┐│ 28.               │
│  │KEYWORD  SET NUMBER  0││ 29.               │
│  │    [             ]   ││ 30.               │
│  └──────────────────────┘│                   │
│         EXECUTE     CANCEL    CONT. BACK     │
└──────────────────────────────────────────────┘
```

Fig. 17(w)

```
| INPUT | REG | RETR | PRINT | COMM | UTIL |

DEF. KEYWORD              MAX KEYWORDS      5120
                                  PRESET KEYWORDS    163

DISK NAME   : Demo 4        | PAGE↑ | PAGE↓ |      | SELECT |
    BINDER NAME : catalog         16. solder
                                  17.
    1. TITLE      :               18.
    2. TECHNOLOGY : *             19.
                                  20.
    3. H.Q.       : *             21.
                                  22.
                                  23.
    4. PRODUCTS   : *             24.
                                  25.
    5. CONTROL NO :               26.
                                  27.
    KEYWORD   SET NUMBER   0      28.
                                  29.
        17.[■           ]         30.

| EXECUTE |  | CANCEL |  | CONT. BACK |
                           ↑
```

Fig. 17(x)

```
| INPUT | REG | RETR | PRINT | COMM | UTIL |

DEF. KEYWORD              MAX KEYWORDS      5120
                                  PRESET KEYWORDS    163

DISK NAME   : Demo 4        | PAGE↑ | PAGE↓ |      | SELECT |
    BINDER NAME : catalog         16. solder
                                  17.       ←
    1. TITLE      :               18.
    2. TECHNOLOGY : *             19.
                                  20.
    3. H.Q.       : *             21.
                                  22.
                                  23.
    4. PRODUCTS   : *             24.
                                  25.
    5. CONTROL NO :               26.
                                  27.
    KEYWORD   SET NUMBER   0      28.
                                  29.
        17.[scanner■    ]         30.

| EXECUTE |  | CANCEL |  | CONT. BACK |
```

Fig. 17(y)

```
| INPUT | REG | RETR | PRINT | COMM | UTIL |
```

DEF. KEYWORD          MAX KEYWORDS      5120
                      PRESET KEYWORDS    163

DISK NAME   : Demo 4
BINDER NAME : catalog      | PAGE | PAGE+ |        | SELECT |
                           16. solder
1. TITLE     :             17. scanner
2. TECHNOLOGY : *          18. ←
                           19.
                           20.
3. H.Q.      : *           21.
                           22.
                           23.
4. PRODUCTS  : *           24.
                           25.
5. CONTROL NO              26.
                           27.
KEYWORD   SET NUMBER  1    28.
                           29.
   17.[          ]         30.

EXECUTE      CANCEL      CONT. BACK

Fig. 17(z)

```
| INPUT | REG | RETR | PRINT | COMM | UTIL |
```

DEF. WORD SELECTOR POSITION     MAX KEYWORDS
                                PRESET KEYWORDS
DISC NAME    :
BINDER NAME  :    | PAGE | PAGE+ |        | SELECT |
                  1. Demo 4 ←
                  2. SOF-M90
                  3. M88 LASER-DISC B
                  4.
                  5.
                  6.
                  7.
                  8.
                  9.
                  10.
                  11.
                  12.
                  13.
                  14.
                  15.

EXECUTE      CANCEL      CONT. BACK

Fig. 17(C)

```
┌─────┬─────┬─────┬─────┬─────┬─────┬──────────┐
│INPUT│ REG │RETR │PRINT│COMM │UTIL │          │
├─────┴─────┴─────┴─────┴─────┴─────┴──────────┤
│ DEF.WORD SELECTOR POSITION MAX KEYWORDS  5120│
│                          PRESET KEYWORDS  163│
│ DISK NAME    : Demo 4   ┌──────┬──────┬──────┐
│ BINDER NAME  : catalog  │ PAGE-│ PAGE+│SELECT│
│                         │16. solder          │
│ 1. TITLE     :          │17.                 │
│ 2. TECHNOLOGY: *         │18.      ←          │
│                         │19.                 │
│                         │20.                 │
│ 3. H.Q.      : *         │21.                 │
│                         │22.                 │
│ 4. PRODUCTS  : *         │23.                 │
│                         │24.                 │
│ 5. CONTROL NO           │25.                 │
│                         │26.                 │
│ ┌────────────────┐      │27.                 │
│ │ [            ] │       28.                 │
│ │   pp.  ℓ,  pp. │       29.                 │
│ └────────────────┘       30.                 │
│         ┌───────┐ ┌───────┐ ┌──────────┐     │
│         │EXECUTE│ │CANCEL │ │CONT. BACK│     │
│         └───────┘ └───────┘ └──────────┘     │
└──────────────────────────────────────────────┘
```

Fig. 17(D)

```
┌─────┬─────┬─────┬─────┬─────┬─────┬──────────┐
│INPUT│ REG │RETR │PRINT│COMM │UTIL │          │
├─────┴─────┴─────┴─────┴─────┴─────┴──────────┤
│ DEF.WORD SELECTOR POSITION MAX KEYWORDS  5120│
│                          PRESET KEYWORDS  163│
│ DISK NAME    : Demo 4   ┌──────┬──────┬──────┐
│ BINDER NAME  : catalog  │ PAGE-│ PAGE+│SELECT│
│                         │16. solder          │
│ 1. TITLE     :          │17. scanner         │
│ 2. TECHNOLOGY: *         │18.       ←         │
│                         │19.                 │
│                         │20.                 │
│ 3. H.Q.      : *         │21.                 │
│                         │22.                 │
│ 4. PRODUCTS  : *         │23.                 │
│                         │24.                 │
│ 5. CONTROL NO           │25.                 │
│                         │26.                 │
│ ┌──────────────────┐    │27.                 │
│ │ [ scanner ] 2/17 │     28.                 │
│ │   pp.2  ℓ,1  r,2 │     29.                 │
│ └──────────────────┘     30.                 │
│         ┌───────┐ ┌───────┐ ┌──────────┐     │
│         │EXECUTE│ │CANCEL │ │CONT. BACK│     │
│         └───────┘ └───────┘ └──────────┘     │
└──────────────────────────────────────────────┘
```

Fig. 17(G)

```
| INPUT | REG | RETR | PRINT | COMM | UTIL |

DISK NAME    : Demo 4          | PAGE- PAGE+        SELECT |
BINDER NAME  : catalog
                                  1. TV
                                  2. radio
1. TITLE      :                   3. ppc
2. TECHNOLOGY :                   4. fax
                                  5. computer
                                  6. file system    ←
3. H.Q.       :                   7. monitor
                                  8. watch
                                  9. lamp
4. PRODUCTS   :                  10. fan
                                 11. heater
5. CONTROL NO : .. ~ ..          12. printer
                                 13. recorder
   RETR:KEYWORD                  14. speaker
     CONDITION[*file■   ]        15. telephone

EXECUTE    CANCEL    DISP.LIST
```

INFORMATION FILING APPARATUS

BACKGROUND OF THE INVENTION

1. Field of the Invention

This invention relates to an information filing apparatus for registering a large number of image information of documents and drawings which can then be retrieved and selectively read-out upon request.

2. Description of the Prior Art

There has been introduced for practical use an information filing apparatus (a document filing apparatus) for registering a large number of image information of documents and drawings which can be optionally read-out.

Such a known information filing apparatus comprises an information file adopted in the form of a mass storage device, e.g. an optical disk, for storing the image information in great volumes and a retrieval file, e.g. a magnetic disk, in which retrieval information is stored for registering and retrieving the image information in relation with the information file, so that the image information can be registered, retrieved and read-out optionally.

For instance, image information, when being registered, is inputted by an image information reading device, e.g. a scanner, and stored it into the information file. Then, a keyword as retrieval information is inputted from a keyboard or multiple item input equipment such as disclosed in Japanese patent application. Laid-Open No. 60-87486 (1985) and stored into the retrieval file in relation to the address data from the information file in which the image information is stored.

On the other hand, by inputting the keyword as retrieval information, the address information is fetched from the retrieval file to retrieve the registered image information and thus, the image information is read-out from the information file based on the address information.

One of the most important factors for the information filing apparatus is to faciliate the input operation of keywords as retrieval information.

For the purpose, an invention such as disclosed in the aforesaid Japanese patent application Laid-Open No. 60-87486 (1985) has been proposed in the form of a multiple item input equipment by which the keywords can be inputted. Such a multiple item input equipment allows only the limited number of keywords to be inputted. Therefore, there is disadvantage that it cannot correspond to an increase in the number of required items for keyword according to the incremental amount of information to be registered by the user.

SUMMARY OF THE INVENTION

It is a primary object of the present invention, in view of the aforesaid aspect, to provide an information filing apparatus having a multiple item input equipment along with the use of a screen in a display device so as to correspond to an increase in the number of keyword which is much required.

It is a second object of the present invention, for the purpose of achieving the first object, to provide an information filing apparatus which is improved in operability.

The above and further objects and features of the invention will more fully be apparent from the following detailed description with accompanying drawings.

BRIEF DESCRIPTION OF THE DRAWINGS

FIG. 10 is a diagrammatic illustration showing the format of a keyword location information file, FIGS. 11 (a) and (b) are flow charts showing another embodiment of the procedure of register processing for image information.

DESCRIPTION OF THE PREFERRED EMBODIMENTS

Preferred embodiments of the present invention will be described in detail with reference to the drawings.

Figure 1:
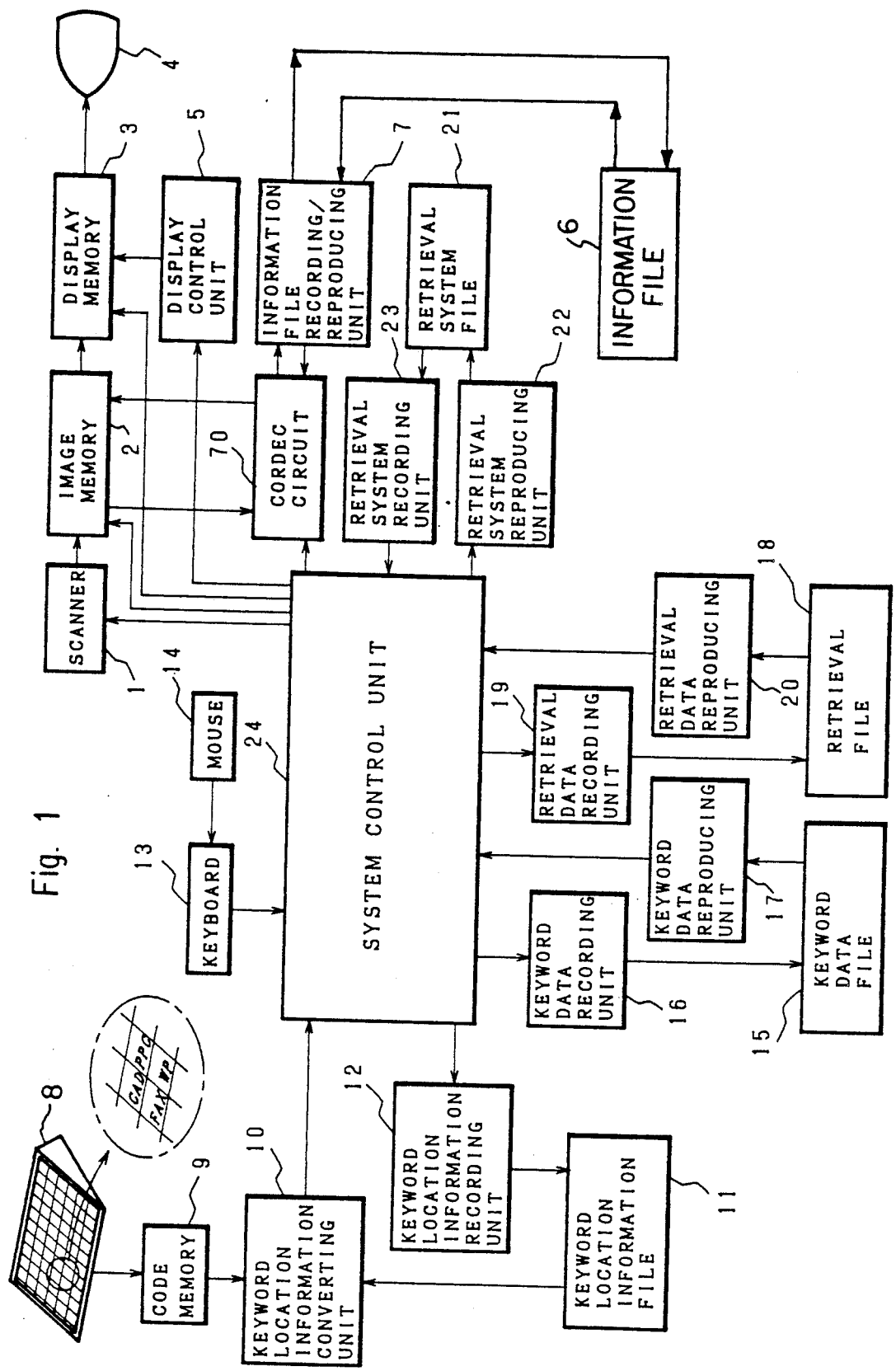
FIG. 1 is a block diagram showing the substantial arrangement of an information filing apparatus according to the present invention.

FIG. 1 is a block diagram showing the complete arrangement of an information filing apparatus according to the present invention.

As shown, the numeral 1 is a scanner as an image information reading apparatus which reads image information by optically scanning the subject (documents or drawings) to be registered into the information filing apparatus and then inputs it after converting it into the form of dot data.

2 is an image memory for storing temporarily a sheet of image information (displayed by one page) inputted from the scanner 1.

3 is a display memory for storing temporarily the image information displayed in one page on a CRT display 4.

The CRT display 4 acts as a main display means for the information filing apparatus of this invention, as displaying the image information stored in the display memory 3.

5 is a display control unit for controlling the display of the image information in the display memory 3 to the CRT display 4.

6 is an information file as an information storage means comprising a mass storage means, e.g. optical disks, for storing a large number of image information.

Figure 2:
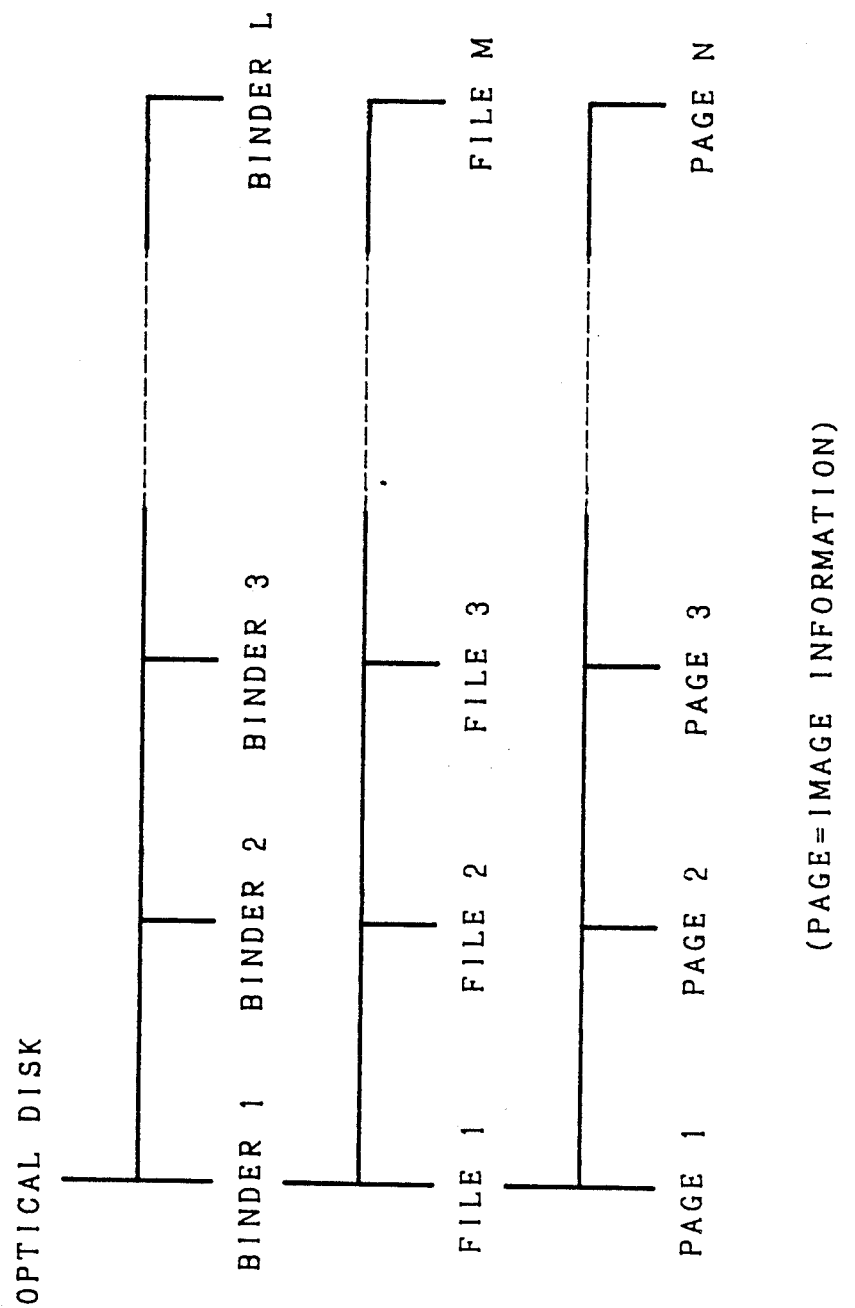
FIG. 2 is a diagrammatic illustration showing the memory hierarchy of image information.

In the information filing apparatus according to the present invention, an image information is recorded for the hierarchy of binder, file, and page on an optical disk serving as a cabinet, as shown in FIG. 2. More specifically, one optical disk divided into a plurality of binders, each binder being divided into a plurality of files, each file being divided into a plurality of pages.

7 is an information file recording/reproducing unit for the information file 6 which carries out the recording (writing of data) and reproducing (reading of data) of image information to and from the information file 6 respectively. Specifically, the image information stored in the image memory 2 is transferred to a codec circuit 70 in which it is converted into coded data through compression coding processing, and then written into the information file 6 by the information file recording-/reproducing unit 7. On the other hand, the image information (coded data) stored in the information file 6 is read out by the information file recording/reproducing unit 7 and transferred to the codec circuit 70, and after decode processing from its coded form, stored in the image memory 2.

8 is a multiple item input equipment comprising a tablet-type key panel which has N pieces of keys mounted thereon in matrix arrangement. There are a plurality of sheets disposed on the keys for setting in circular order. Particularly, when one of the keys of the multiple item input equipment 8 is pressed, the specified code data corresponding to the pressed key and set of sheet are generated. The code data comprises X-direction data and Y-direction data with respect to the tablet arrangement of keys and the number of sheets.

9 is a code memory for storing temporarily a code data generated by the multiple item input equipment 8.

10 is a keyword location information converting unit for converting the coded data supplied from the multiple item input equipment 8 and stored in the code memory 9 into their respective serial numbers of 1 to n×N (n is the page number of a sheet). More particularly, the relation between the code data and the serial numbers of keywords are stored in the keyword location information file 11, the keyword location information converting unit 10 reads the serial number of the key which is actually pressed from the contents of a keyword location information file 11 and the code memory 9.

FIG. 10 is a diagrammatic illustration showing storage contents of the keyword location information file 11. As shown, the keyword location information is stored in the arrangement of sheet numbers for the multiple item input equipment 8, X (column) directional location data, Y (line) directional location data, and serial numbers in due order. There can be stored a large number (m1) of keyword location information given by multiplying the number of sheets by the number of keys on the multiple item input equipment 8.

12 is a keyword location information recording unit for recording the keyword location into the keyword location information file 11 at the setting of keywords with respect to the keys on the multiple item input equipment 8.

13 is a keyboard utilized for input of keywords, keyword numbers, and various control signals. The keyboard 13 is provided with a mouse 14 as a pointing device.

Figure 9:
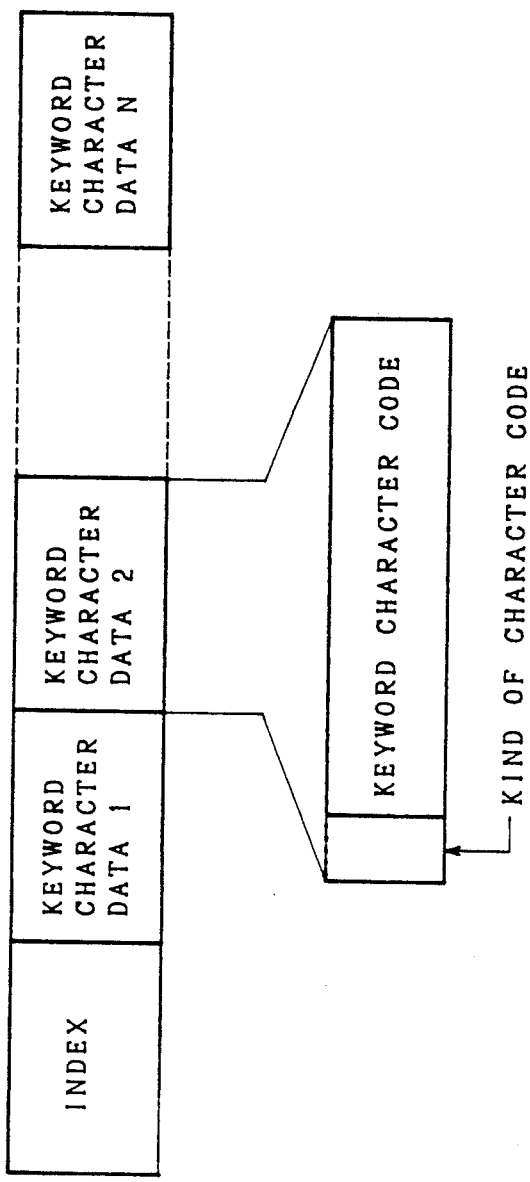

15 is a keyword data file storing the keywords and the keyword number relatively. The storage content in the keyword data file 15 are as shown in FIGS. 9(a) and 9(b). FIG. 9(a) shows a basic format of the keyword data file 15 assigned for a binder one by one. The format has at front an index section followed by the sections in which character data of the each keyword data are consecutively stored. The order of character data in the keyword data file 15 represents a serial numbers for the keywords. The character data of keyword comprises a one-bit code representing a kind of character code (i.e. "0" represents the ASCII code while the "1" represents the JIS code.) and an real character code.

FIG. 9(b) shows one embodiment of the storage content of the keyword data file 15. If there are three retrieval items or keyword items: the first includes "OA", "FA", and "HA"; the second includes "electronic file", "FAX", and "personal computer"; the third includes "communication" and "image processing", the index section stores in order the numbers of items and a serial number of the first keywords of each items. The character codes of the keywords are also arranged in a order. In addition, FIG. 9(b) does not corresponds to the FIGS. 17 which show the screen of the CRT display 4.

The number of keywords m2 which can be stored in the keyword data file 15, that is, the number m2 which can be displayed on the CRT display 4 is set larger than or equal to m1 (m2≧m1) and is desirable larger than (m2>m1).

The keyword data file 15 is provided with a keyword data recording unit 16 for recording of keyword data and a keyword data reproducing unit 17 for reading of keyword data.

Figure 8:
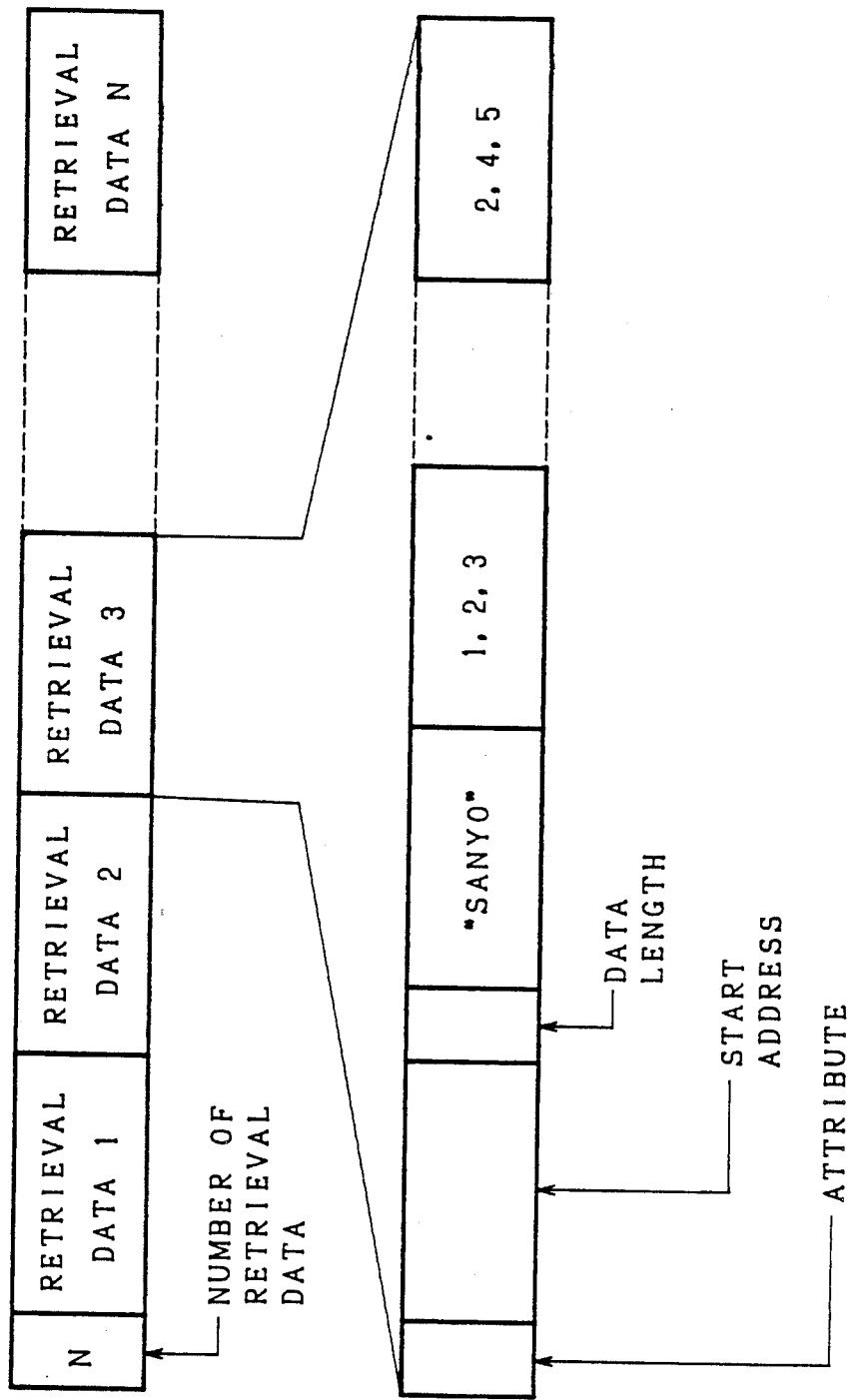
FIG. 8 is a diagrammatic illustration showing the format of a retrieval file, FIGS. 9 (a) and (b) are diagrammatic illustrations showing the format of a keyword data file.

18 is a retrieval file in which the address information for identifying the location of recorded image information in the information file 6 and the set keywords for the image information are stored in mutual relationship. More specifically, storage content of the retrieval file 18 is as shown in FIG. 8. There are stored, at front, number N of retrieval information and then, retrieval data as a respective retrieval information. The retrieval data include in due order from the front, attribute of the image information (e.g. size, resolution, and scale), start address for the image information in the information file 6, the data lengths of image information, and consecutively, retrieval information provided for registering the image information such as a title ("SANYO") and serial number ("1, 2, 3") for the keywords.

In addition, serial numbers are recorded with being divided into groups corresponding to each retrieval items.

The retrieval file 18 is also provided with a retrieval data recording unit 19 for recording of the retrieval data and a retrieval data reproducing unit 20 for reproducing of the retrieval data.

21 is a retrieval system file provided with a retrieval system recording unit 22 and a retrieval system reproducing unit 23.

Finally, 24 is a system control unit comprised a microprocessor and employed as a control center of the information filing apparatus according to the present invention. The system control unit 24 also serves a keyword list display means.

The operation in the aforesaid arrangement of the information filing apparatus of this invention will be described hereinafter.

Figure 3:
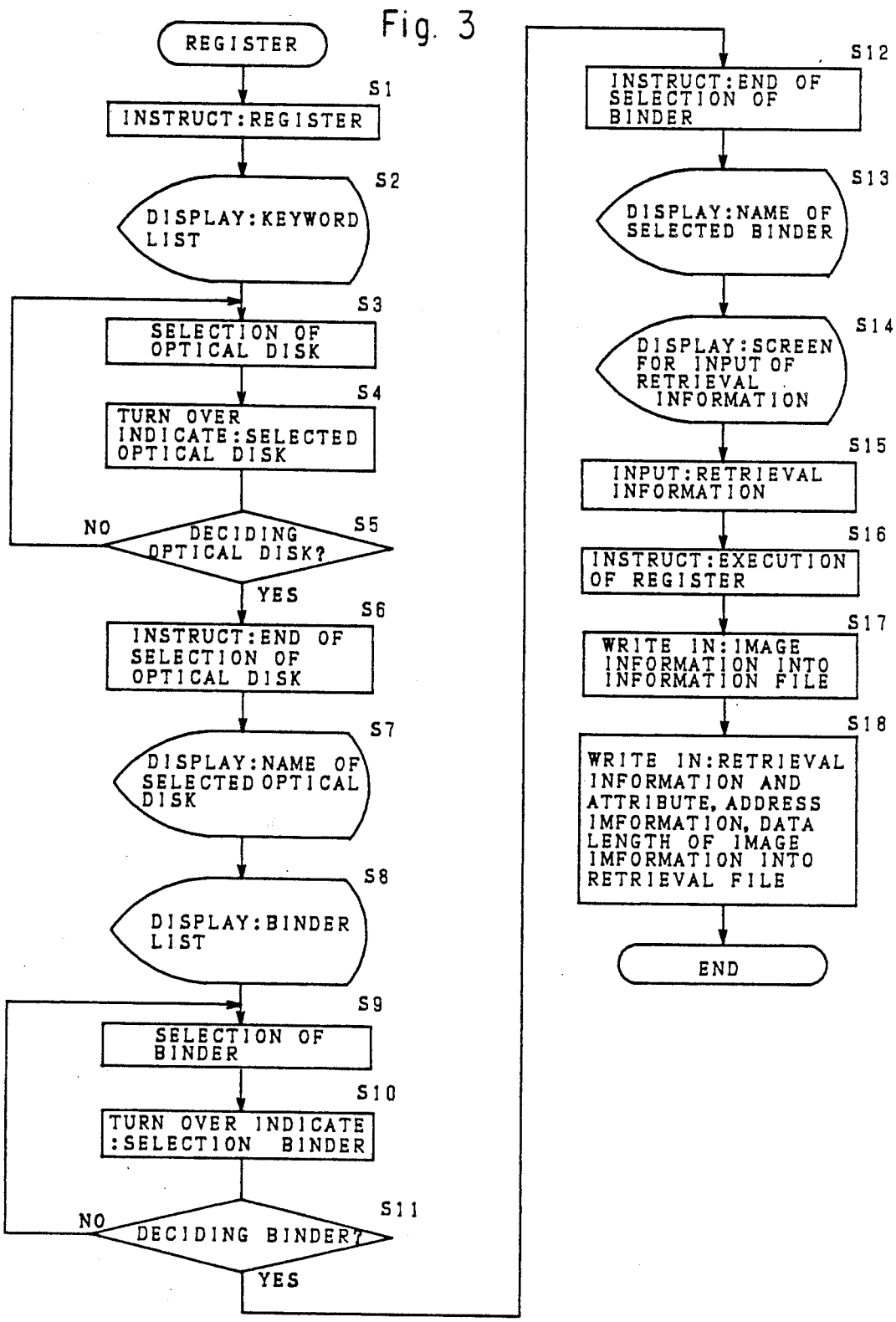
FIG. 3 is a flow chart showing the procedure of register processing for image information.

It begins with the register processing for image information with reference to the flow chart of FIG. 3 showing the steps of its procedure.

Figure 17A:

When a command to start the register processing for image information is given by the keyboard 13 (Step S1), the system control unit 24 operates to access the retrieval system file 21 through the retrieval system recording unit 22 and thus, all the processable optical disks are displayed in a list on the CRT display 4 as shown in FIG. 17(a) (Step S2). As illustrated in FIG. 17(a), three of the disks; "Demo 4", "SOF-M90", and "M88 LASER-DISC B", are available for selection.

For the purpose of selecting one of the displayed disks (Step S3), the user can use either the mouse 14 (to move an arrow-like cursol to the location of a disk name in the display for clicking) or the keyboard 13 (by hitting one of its numeric keys corresponding to the number of the required disk).

For instance, when the "Demo 4" disk representing No. 1 is selected, it is turn over displayed as shown in FIG. 17 (b) (Step S4). Then, by clicking the display of "SELECT" with the mouse 14, the selection of the disk is completed (Steps S5 and S6). The name of selected disk is thus displayed in the section of "DISC NAME" (Step S9). The system control unit 24 operates once again to access the retrieval system recording unit 22 through the retrieval system reproducing unit 23 and thus, the binders defined in the selected disk are displayed as a list on the CRT display 4 as shown in FIG. 17(c) (Step S8).

When one of the binders is selected in the same manner as the selection of a disk, it its then turn over displayed as shown in FIG. 17(d) (Steps S9 and S10). As shown, the binder of "catalog", No. 2, is displayed in this case.

Figure 17B:
Figures 17E, 17F:

Similarly, by clicking the section of "SELECT" with the mouse 14, the selection of a binder is completed (Steps S11 and S12). The name of selected binder is thus displayed in the section of "BINDER NAME". Further, the system control unit 24 operates to access the retrieval system recording unit 22 through the retrieval system reproducing unit 23 and then, a retrieval system in the selected binder is displayed on the CRT display 4 as shown in FIG. 17(e) (Step S14).

The retrieval system can be defined in each binder and stored by the units of binder in the retrieval system file 21, in which defined are "1. TITLE", "2. TECHNOLOGY", "3. H.Q.", "4. PRODUCTS", "5. CONTROL NO", etc.

The retrieval information, e.g. title and keyword information, accompanying the image information to be registered is then inputted (Step S15). The retrieval information can be inputted by any method of word-processor type key operation with the use of a keyboard 13, employing a multiple item input equipment 8 (referred to as a first keyword input means), and also, by selecting from the list of keywords shown on the CRT display 4 (referred to as a second keyword input means).

The title is inputted through the keyboard 13. After the section of "title" is clicked with the mouse 14 as shown in FIG. 17(e), The character keys on the keyboard 13 are pressed to input, for example, "SANFILE SOF-M88" and then, the input characters are displayed as shown in FIG. 17(f).

Figure 4:
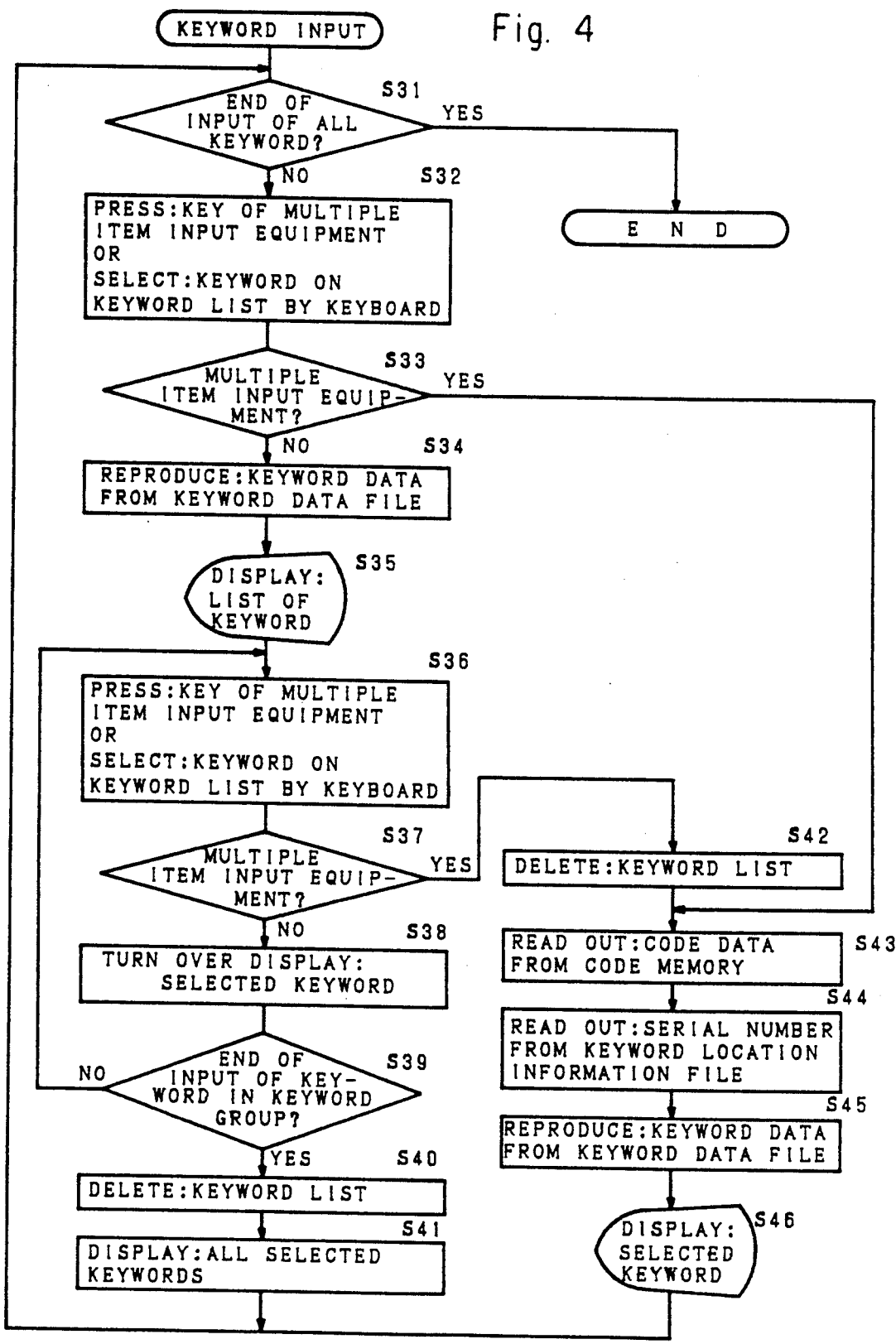
FIG. 4 is a flow chart showing the procedure of keyword input, FIGS. 5 (a) and (b) are flow charts showing the procedure of retrieval and reading for image information.

The input of a keyword with the use of the second keyword input means will be described. FIG. 4 is a flow chart showing the procedure of control of the system control unit 24 at the input of keywords through either the first or second keyword input means.

For example, setting of a keyword to the item of "PRODUCTS" will be described.

As shown in FIG. 17(g), the input of a keyword by the second keyword input means is instructed by clicking of the mouse 14 at the section of "PRODUCTS" on the display. The system control unit 24 then proceeds the processing to steps S31, S32, S33, and S34. When the keyword data are read out from the keyword data file 15 through keyword data reproducing unit 17, the list of keywords is displayed on the CRT display 4 as shown in FIG. 17(h) (Step S35).

In addition, if the number of the keywords is more than that the CRT display 4 can show all together on a section of its screen, the list of keywords is displayed on a plurality of pages. The system control unit 24 activates the CRT display 4 to show the first page of the keyword list. When instructed through the keyboard 13 or mouse 14, the following page (or preceding page) is then displayed.

The numerals applied to the keywords in the keyword list are the serial numbers of each keyword.

When the keyword required by the user is found in the keyword list displayed on the CRT display 4, the serial number of the keyword is entered by hitting the corresponding numeral key of the keyboard 13 or, as shown in FIG. 17(h), the keyword itself is directly clicked on the display by operating the mouse 14 (Steps S36 and S37). The selected keyword is then turn over displayed as shown in FIG. 17(i) (Step S38).

By repeating the aforesaid steps of procedure, the plurality of keywords can be input through the second keyword input means. When the user clicks the section of "SELECT" on the display with the mouse 14 or uses the keyboard 13 for instruction after the input of all the required keywords, the keyword list disappears from the screen (Steps S39 and S40). Then, as shown in FIG. 17(j), the selected keywords are all displayed (Step S41).

On the other hand, to input the keywords by the first keyword input means, the corresponding key of the multiple item input equipment 8 must be pressed immediately after the title is inputted. (Input of the title is not necessary.) The system control unit 24 then carries out the processing to steps S31, S32, S33, and S34. The code data generated from the multiple item input equipment 8 by pressing key thereof is temporarily stored in the code memory 9 and then, read-out by the keyword location information converting unit 10 (Step S43). The keyword location information converting unit 10 obtains the serial number of the keyword corresponding to the pressed key based on the code data and the information read out from the keyword location information file 11 (Step S44) which is then supplied to the system control unit 24. The system control unit 24 reads out the data of character string of the keyword from the keyword data file 15 through the keyword data reproducing unit 17 corresponding to the supplied serial number (Step S45). The character string data read out from the keyword data file 15 is transferred to the display control unit 5 together with the information of display location (location of the corresponding item), written into the display memory 3, and displayed on the CRT display 4 (Step S46).

By successively pressing the keys of the multiple item input equipment 8, the plurality of keywords can be inputted through the first keyword input means and displayed consecutively in their respective sections of the item.

If the input of keywords through the first keyword input means is instructed during the keyword input operation by the second keyword input means, the processing proceeds from the step S37 to the step S42 and thus, the keyword list is eliminated from the screen. On the other hand, if the input of keywords through the second keyword input means is instructed during the keyword input operation by the first keyword input means, the processing proceeds from the step S33 to the step S34 and thus, the keyword list is displayed on the screen.

When the execution of registering is instructed by the user with the pressing execution keys of the keyboard 13 or clicking the section of "EXECUTE" on the screen by the mouse 14 (Step S16) after the completion of setting the keywords through either the first or second keyword input means or both of them, the system control unit 24 carries out the processing of register for image information. More particularly, the system control unit 24 allows the image information stored in the image memory 2 to be compression coded by the codec circuit 70 and transferred through the information file recording/reproducing unit 7 to the information file 6 for storage (Step S17). At the same time, the information including address, recording data length, and attribute (e.g. size and resolution) at the time when the image information is stored in the information file 6 is also transferred to the retrieval data recording unit 19 and stored for record in the retrieval file 18 together with a retrieval information which is previously inputted (Step S18).

Figure 5A:
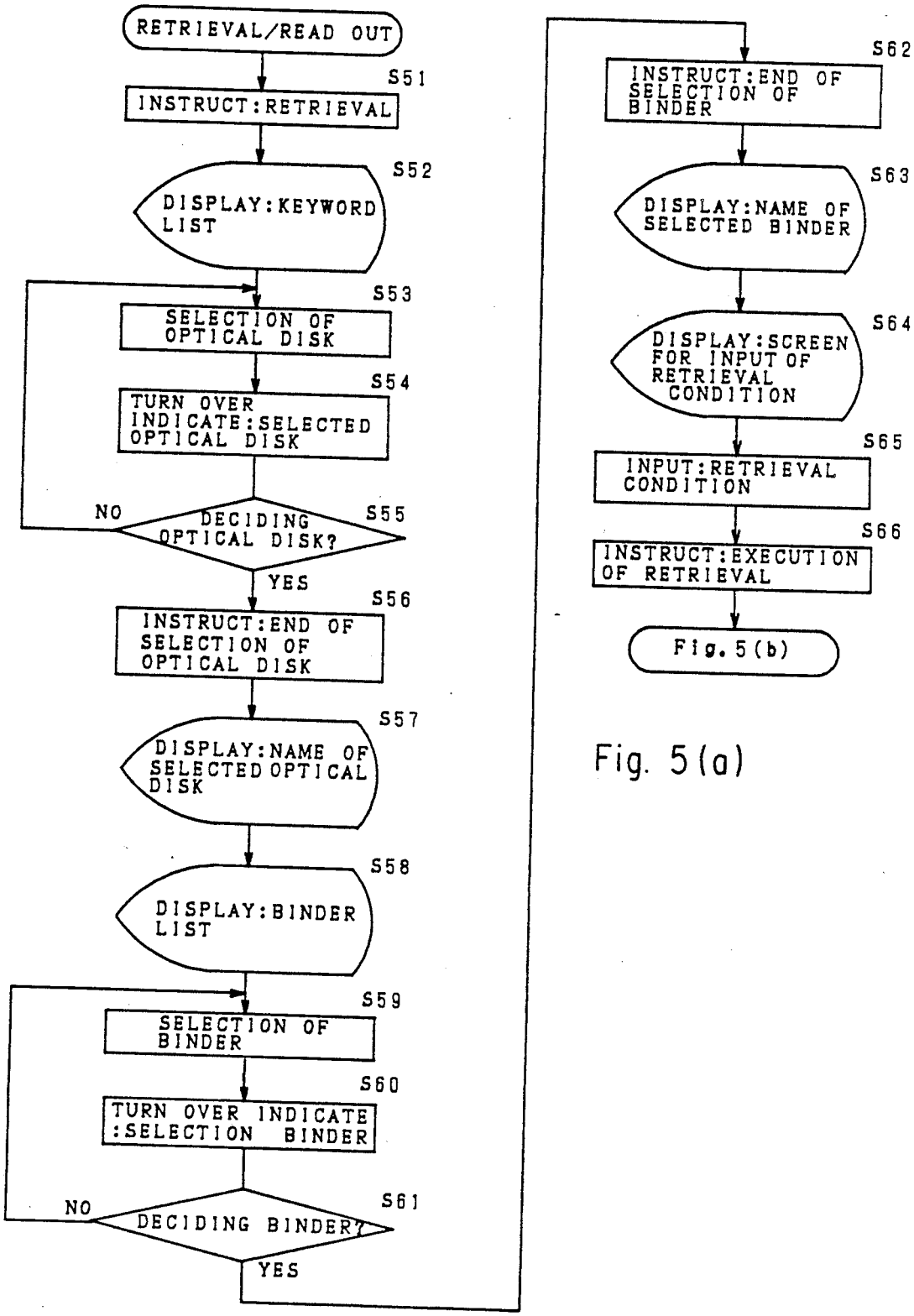
Figure 5B:
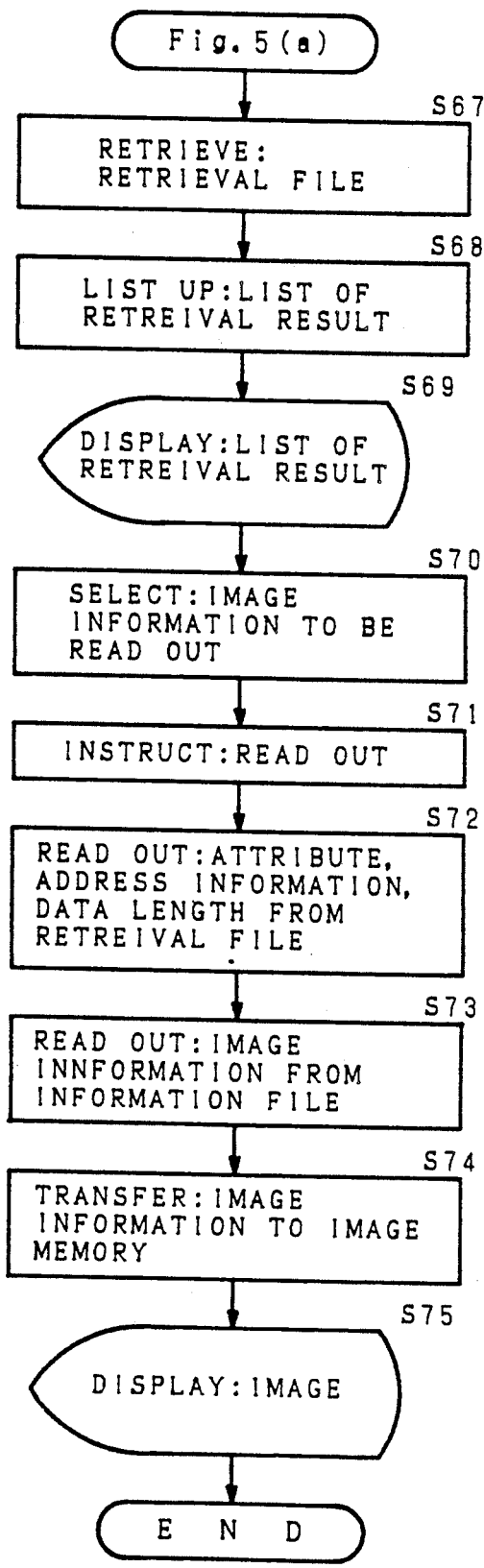

The processing of retrieving and reading out the image information which is already registered will be described with referring to the FIGS. 5(a) and (b).

When the retrieval is instructed by the operation of the keyboard 13 or by clicking the section of "RETR RETRIEVE)" on the screen of the CRT display 4 with the mouse 14 (Step S51), the system control unit 24 operates to dislay the list of processable disks in the same manner as the processing of register of image information (Step S52), as shown in FIG. 17(k). Then, selection of binder, displaying of binder, and displaying of retrieval system are consecutively executed in the same manner as the processing of register (Steps S53 to S64), as shown in FIGS. 17(l) and 17(m).

While the retrieval system is displayed, the retrieval conditions (a title, keywords, etc.) about the required image information can be supplied by the user (Step S65) in the same manner as the processing of register with the first and second keyword input means, as shown in FIGS. 17(n), 17(o), 17(p), 17(q), and 17(r). As shown in FIG. 17(q), there are two keywords, "file system" and "computer", applied to the item of "PRODUCTS" according to the embodiment.

When the execution of retrieval is instructed by the keyboard 13 or mouse 14 after the input of the keywords (Step S66), the system control unit 24 activates the retrieval data reproducing unit 20 to reproduce the retrieval data from the retrieval file 18 and thus, operates to retrieve the image information which satisfies the retrieval conditions (Step S67). Consequently, the retrieval result causes the system control unit 24 to provide an image of list of the retrieval result and store it in the display memory 3, as shown in FIG. 17(r) (Step S68). The list of retrieval result stored in the display memory 3 is displayed on the screen of the CRT display 4 by the operation of the display control unit 5 (Step S69).

If the list of retrieval result fails to include the required image information as being displayed on the CRT display 4, the retrieval conditions are changed and therefore, the retrieval must be repeated.

When the required image information is present in the list, the selection of image information is instructed with the keyboard 13 or mouse 14 (Step S70). Further, the execution of reading out is instructed (Step S71).

After the selection and reading out of image information is instructed, the system control unit 24 activates the retrieval data reproducing unit 20 to read out the information of address, data length, and attribute with respect to the image information at the information file 6 from the retrieval file 18 (Step S72) and accordingly, operates to read out the image information from the information file 6 (Step S73). The image information read out from the information file 6 is in the form of compression data and therefore, transferred to the codec circuit 70 for decode processing or restoration by extension processing (Step S74). The decoded data of image information is then written into the image memory 2. The image information stored in the image memory 2 is further transferred to the display memory 3 for writing in and then displayed on the CRT display 4 (Step S75).

Figure 6:
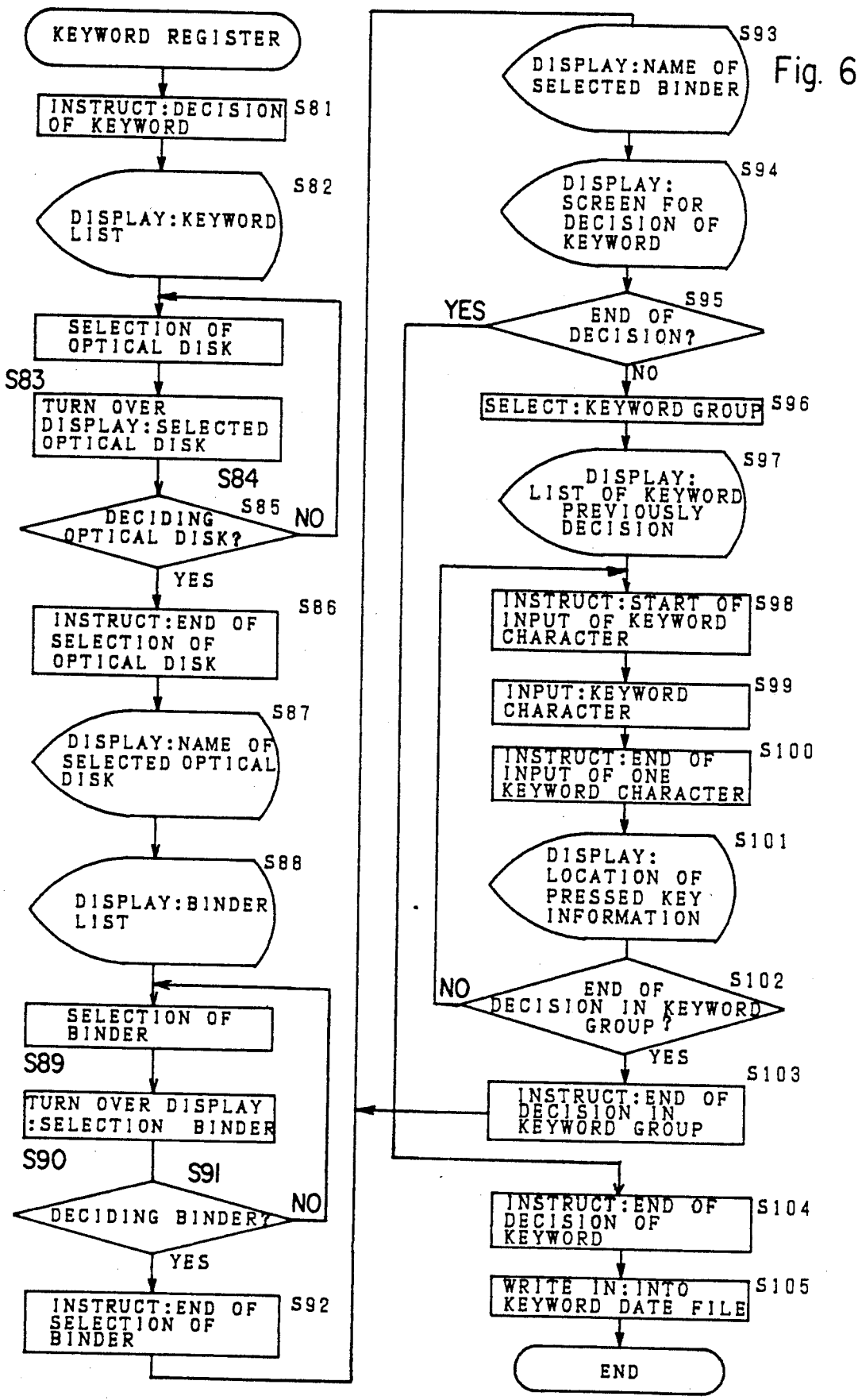
FIG. 6 is a flow chart showing the procedure of definition processing for keyword data.

Next, the procedure for initial definition of keywords will be described with reference to the flow chart of FIG. 6.

When the processing of register for keywords ("DEFINE KEYWORD" in "UTILITY") is instructed by the keyboard 13 or mouse 14 (Step S81), a disk and its binder are determined in the same manner as the register and retrieval of image information (Steps S82 to S93). As shown in FIGS. 17(s) and 17(t), the keyword definition screen is displayed on the CRT display 4 (Step S94).

An item to be registered next is designated with the keyboard 13 or mouse 14 (Step S96). According to the embodiment, the section of "PRODUCTS" is selected by clicking with the mouse 14 as shown in FIG. 17(u). When there are keywords which are previously, the keywords in a list are read from the keyword data file 15 by the system control unit 24 and displayed on the CRT display 4 (Step S97), as shown in FIG. 17(v). In this case, the second page of the registered keyword list is shown.

In addition, each "*" indicated at right side of some retrieval items in the FIG. 17(u) means that the retrieval items with "*" one defined as the keyword item.

Next, as shown in FIG. 17(w), when the input of characters of a new keyword is instructed (Step S98) as the 17th keyword because the registration of keywords already done upto the 16th at the FIG. 17(v). When the keyword characters are inputted by the keyboard 13, the new keyword is displayed in the alphabet on the screen of the CRT display 4 as shown in FIG. 17(x) (Step S99). Then, by pressing the execution key of the keyboard 13 or clicking the section of "EXECUTE" on the screen with the mouse 14, the input of one keyword is completed (Step S100). The system control unit 24 operates to display the inputted keyword at the position in the keyword list corresponding to the serial number on the screen as shown in FIG. 17(y) (Step S101).

To input another keyword, the procedure returns from the step S102 to the step S98 for repeat processing.

After the processing of definition for one group of keywords is completed (Step S103) and all the processing of keyword definition is completed, the steps S103, S95, and S104 are executed in due order. Then, the system control unit 24 transfers the keyword data of the inputted keywords to the keyword data recording unit 16 for recording in the keyword data file 15 (Step S105).

Figure 7:
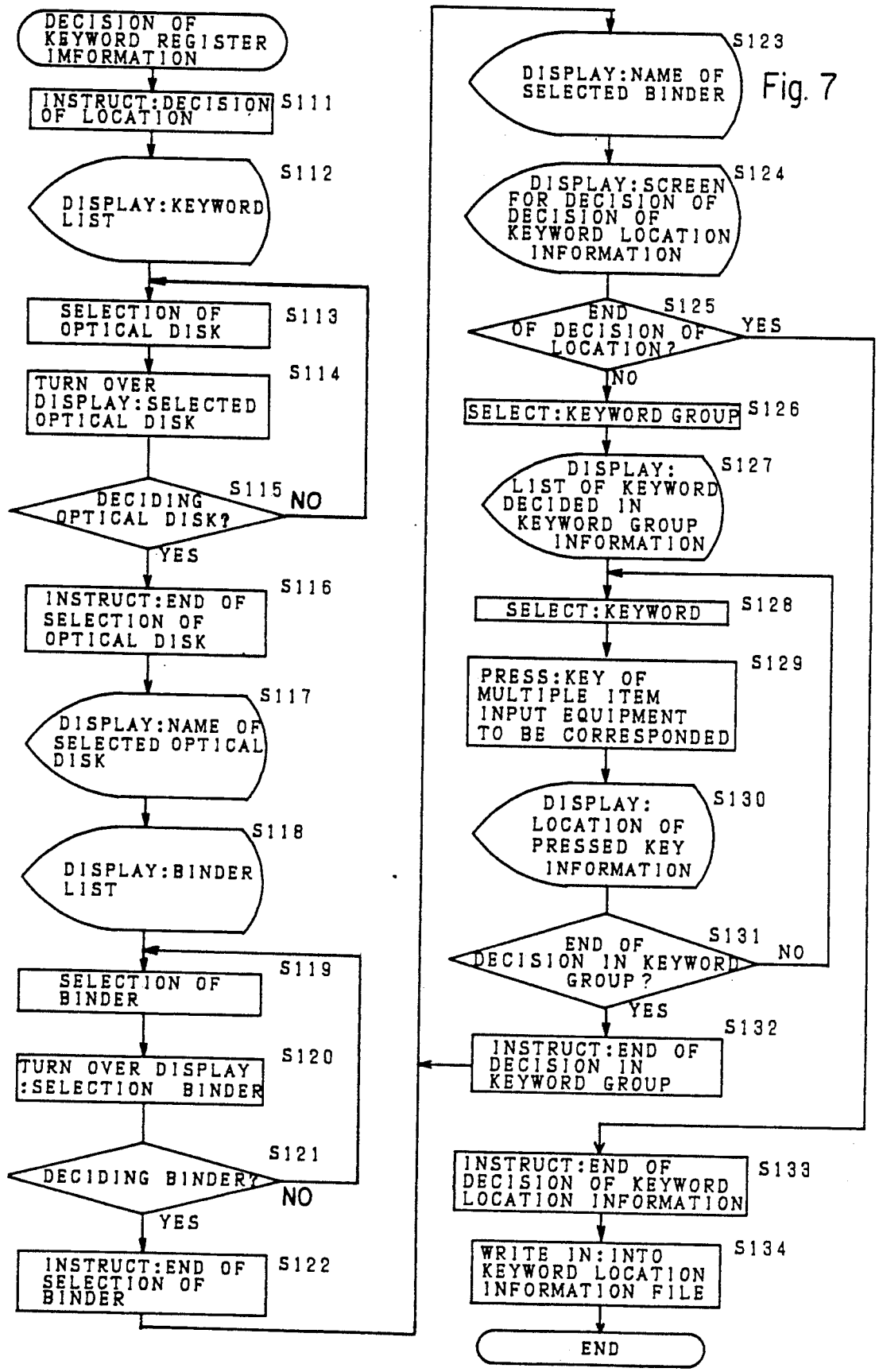
FIG. 7 is a flow chart showing the procedure of definition processing for keyword location information.

The information filing apparatus according to the present invention is provided with the multiple item input equipment, so that processing for corresponding a portion of the previously registered keywords to keys of the multiple item input equipment 8. This processing of definition for keyword location information will then be described with reference to the flow chart of FIG. 7 which illustrates its procedure.

When the start of the register processing for keyword location information ("DEF. WORD SELECTOR POSITION" in "UTILITY") is instructed by the keyboard 13 or mouse 14, a disk and its binder are determined in the same manner as the register and retrieval of image information (Steps S112 to S123). As shown in FIGS. 17(z) and 17(A), the screen of the definition of keyword location information is then displayed on the CRT display 4 (Step S124).

Next, a group of keywords which contains the required keyword for corresponding to the key of the multiple item input equipment 8 is selected with the keyboard 13 or mouse 14 (Step S126). FIG. 17(B) shows that the item of "PRODUCTS" is clicked by the mouse 14. Accordingly, the system control unit 24 operates to access the keyword data file 15 through the keyword data reproducing unit 17 and then display the list of keywords on the CRT display 4 (Step S127) as shown in FIG. 17(C). In this case, the second page of the list is shown.

Then, the keyword required for corresponding to the key of the multiple item input equipment 8 is selected and designated by the user through the keyboard 13 or mouse 14 (Step S128). When the user presses the key of the multiple item input equipment 8 which is required to correspond to the specified keyword (Step S129) or uses the numeric keys of the keyboard 13 for definition of a location, the keyword location is displayed as shown in FIG. 17(D) (Step S130). When a plurality of keywords are required of corresponding to their respective keys of the multiple item input equipment 8, the procedure is returned from the step S132 to the step S128 for repeat of the processing.

In addition, as described above, when keyword location determination is executed by operation of the multiple item input equipment 8, operation is easy, simple and speedy for operation of the keyboard 13 requiring input of sheet number, X- and Y-locations.

After the processing of definition for one group of keywords is completed (Step S132) and also, all the processing for groups is completed, these are instructed by the user with the keyboard 13 or mouse 14. Then, the procedure proceeds from the step S125 to the step S133. The system control unit 24 transfers the information of keyword location inputted to the keyword location information recording unit 12 for storage in the keyword location information file 11 (Step S134). The data in the keyword location information file 11 is effective at reading out in the case where they are sorted with respect to the sheet numbers and X- and Y-location of the multiple item input equipment.

Next, another embodiment of the present invention will be described.

Figure 11A:
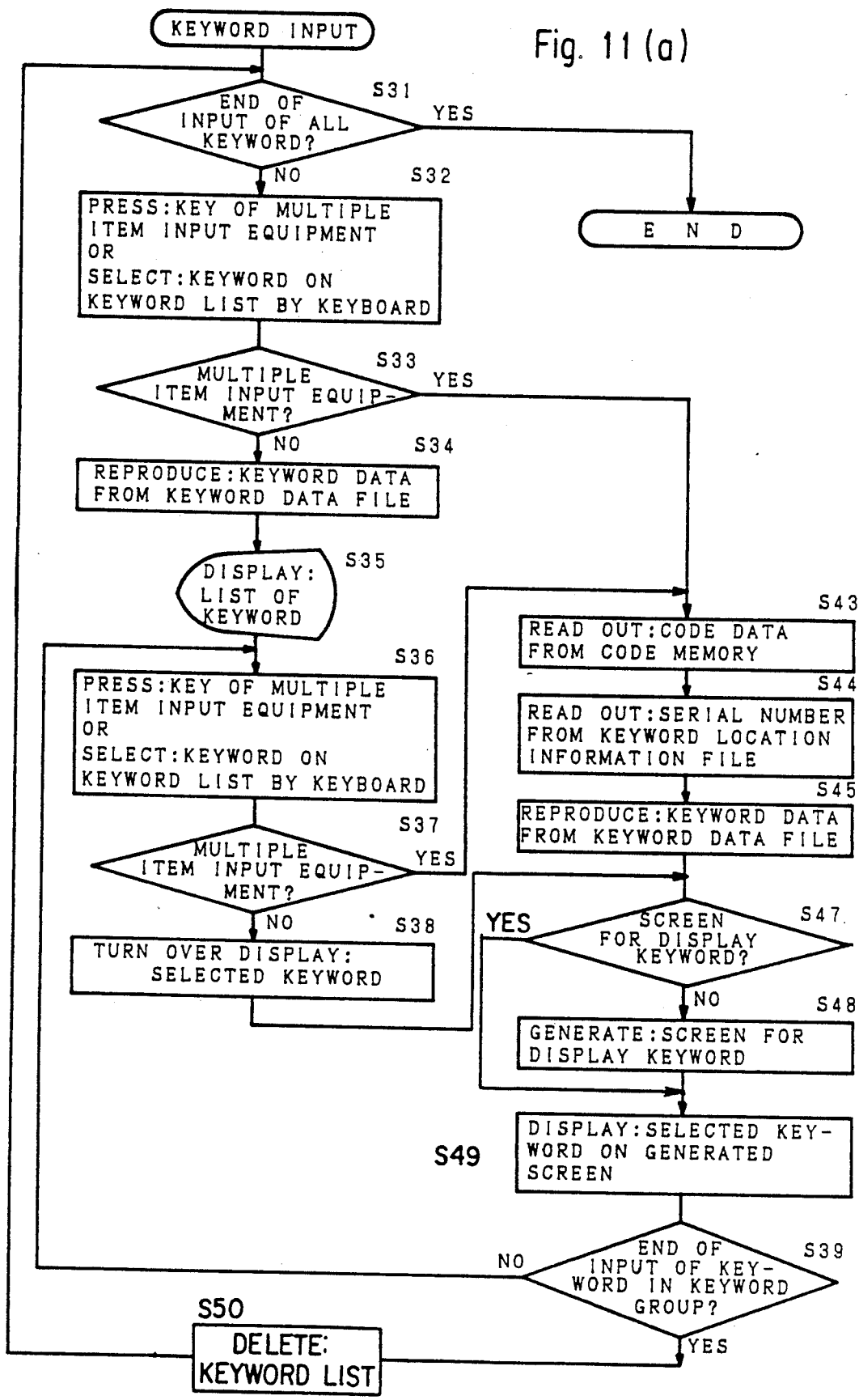

FIG. 11(a) is a flow chart showing the procedure of register processing for image information according to this embodiment.

In the first embodiment described previously, when the multiple item input equipment 8 as the first keyword input means is operated during the selection of keyword by the second keyword input means or the CRT display 4 showing the list of keywords, the processing proceeds from the step S37 to the step S42 for deleting the keyword list. According to this embodiment, the list of keywords however remains on display using means for displaying the keyword selected by the first keyword input means in a area on the screen of the CRT display 4 separated from the area of the keyword list.

More specifically, the same procedure is executed from the step S31 to the step S38 as of the register processing for image information shown in FIG. 3. When the key of the multiple item input equipment 8 is pressed in the step S37 during the keyword input by the second keyword input means, the steps of S43, S44, and S45 are consecutively executed in the same manner as the procedure of FIG. 3. If the CRT display 4 shows no screen of the selected keyword, the steps of S47 and S48 are executed to provide a screen for displaying keywords and thus the selected keyword is displayed in the screen for displaying keyword (step S49). The display for a selected keyword on the screen for displaying keyword is also applicable to a keyword selected by the second keyword input means, as shown in the flow chart of FIG. 11(a).

Figure 12:
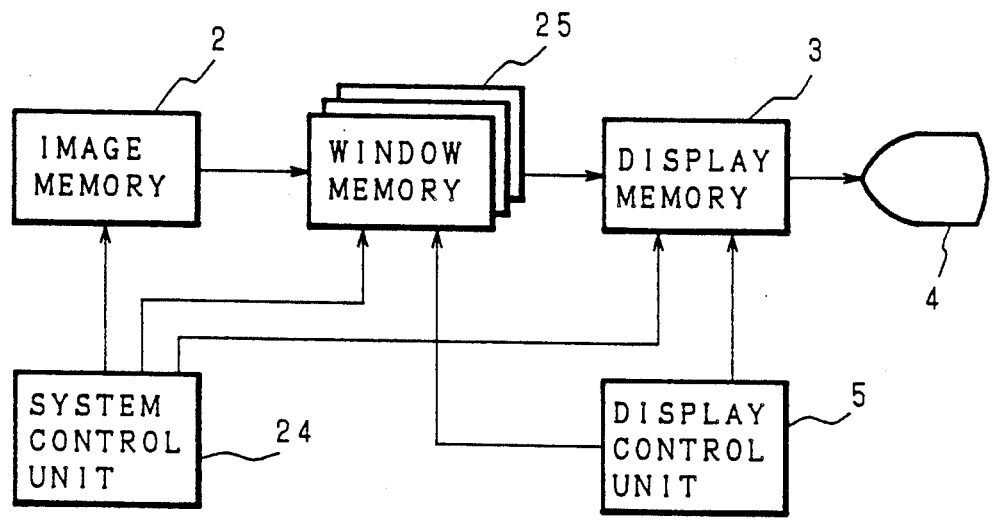
FIG. 12 is a partial block diagram of an arrangement including a window memory of an information filing apparatus according to the present invention.

Such display processing may preferably employ a method of so called multiwindow display. Particularly, as shown in FIG. 12, interposed between the image memory 2 and the display memory 3 is a window memory 25 which can provide the multiwindow display as being controlled by the system control unit 24 and the display control units 5.

Furthermore, at displaying of the keyword list by the second keyword input means, the keywords can be arranged on the screen in the order of frequency in use. This allows the user to operate effectively and efficiently and erase low frequency keywords with ease.

Figure 13:
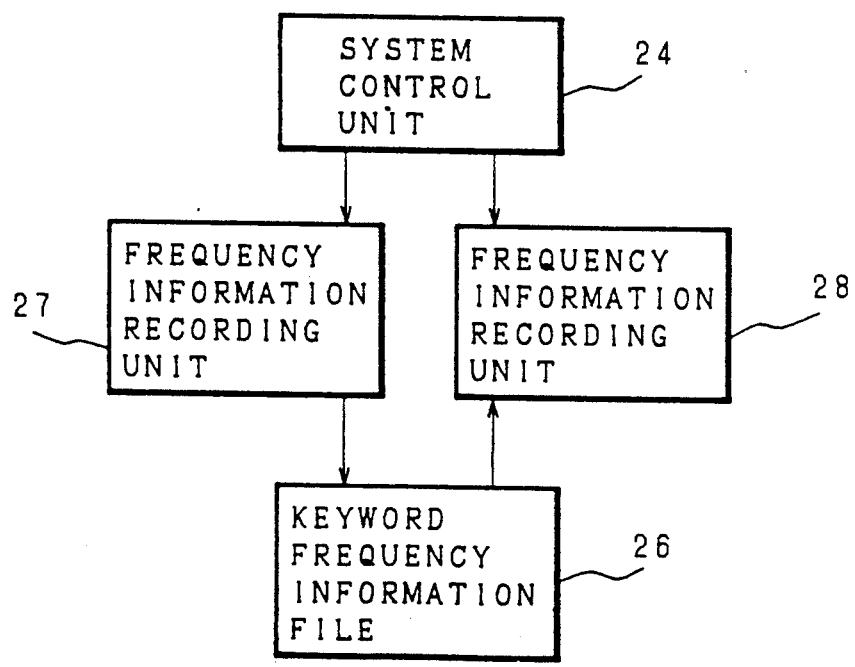
FIG. 13 is a partial block diagram of an arrangement including a keyword frequency file of the same.

Particularly to embody such an arrangement, a keyword frequency file 26 is employed as means for storage the frequency in use of keywords as shown in FIG. 13.

Figure 14:
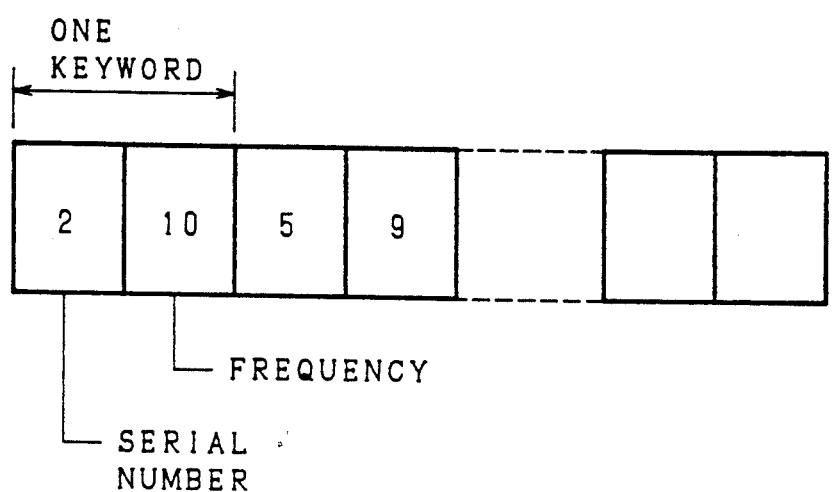
FIG. 14 is a diagrammatic illustration showing the format of the keyword frequency file.

The storage content of the keyword frequency file 26 is such as shown in FIG. 14. There are two storage areas for serial numbers and frequency in use of the keywords. When a keyword is used, its storage area of frequency in use is increased by adding +1.

Figure 15:
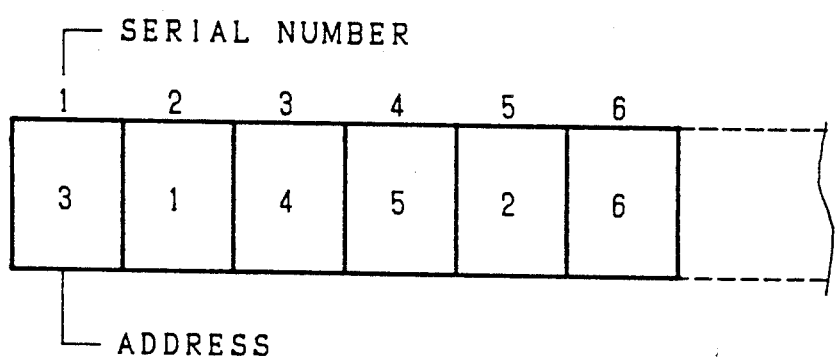
FIG. 15 is a diagrammatic illustration showing the format of a keyword frequency information index file.

When an index file for keyword frequency information is additionally provided having data shown in FIG. 15, the quick access to the keyword frequency file 26 becomes possible. Specifically, the index file indicates the location of frequency data in the keyword frequency file 26 arranged in the order of serial numbers of the keywords. The processing can thus be improved in operational quickness as the keyword frequency file 26 is accessed with reference to the index file.

The keyword frequency file 26 is provided with a frequency information recording unit 27 for writing data thereto and a frequency information reproducing unit 28 for reading data therefrom.

As the keyword frequency file 26 is incorporated with the arrangement, the frequency in use of the keywords can be displayed on the screen of the CRT display 4 while the keyword list is displayed on display by the second keyword input means as shown in FIG.

17(E). Accordingly, this allows the user to find and erase keywords of low frequency in use with ease for the optimum use of the storage areas in the keyword data file 15.

While the keyword list is displayed by the second keyword input means, keywords with no relation to the keys of the multiple item input equipment 8 may be indicated by appropriate arrangements as shown in FIG. 17(F) (in which asterisk mark * is used). Such displaying can be realized by referring to the data from the keyword location information file 11 whether the keywords are arranged to correspond to their respective keys of the multiple item input equipment 8 or not when the keywords read out from the keyword data file 15. It will also be easy to display the location of the keywords corresponding to the keys of the multiple item input equipment 8. Additionally, a list of the keywords with no relation to the keys of the multiple item input equipment 8 only may be displayed while the keywords corresponding their respective keys of the multiple item input equipment 8 are displayed in case of the use of the multiple item input equipment 8.

However, it may be troublesome to search a keyword from the keyword list on display when there are a large number of keywords which are thus listed on a multiplicity of pages of the list. To solve such a problem, a retrieval means for keywords is also provided for use. As shown in FIG. 17 (G), for example, the keyword retrieval screen is displayed on the CRT display 4 by the instruction of keyword retrieval. When, for example, "file" is inputted by the keyboard 13, the list of all keywords including "file" can then be displayed.

Figure 11:
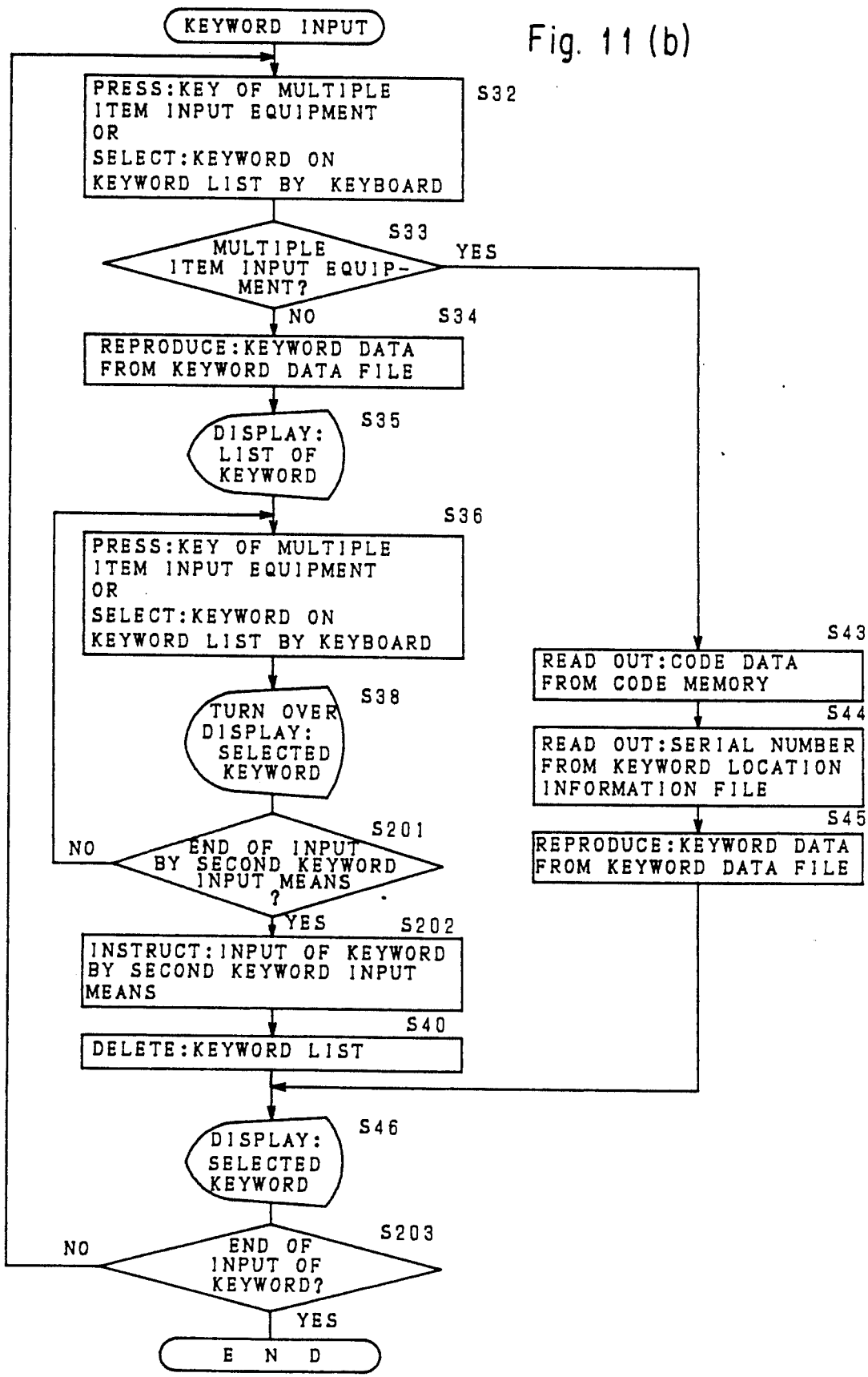

FIG. 11 (b) is a flow chart of the procedure of another register processing of this embodiment.

This procedure has a purpose for prevent from no displaying keyword which is inputted by the multiple item input equipment 8 during the keyword list is displayed on the CRT display 4. In this procedure, when the second keyword input means is used for input of keyword at step S33, input of keyword by the first keyword input means (the multiple item input equipment 8) is inhibited until the keyword list is deleted at the step S40. Thus, input of keyword by the multiple item input equipment 8 is inhibited when the second keyword input means operates to input keyword from the step S33 to S40 through steps S34, S35, S36, S38, S201 and S202.

Figure 16:
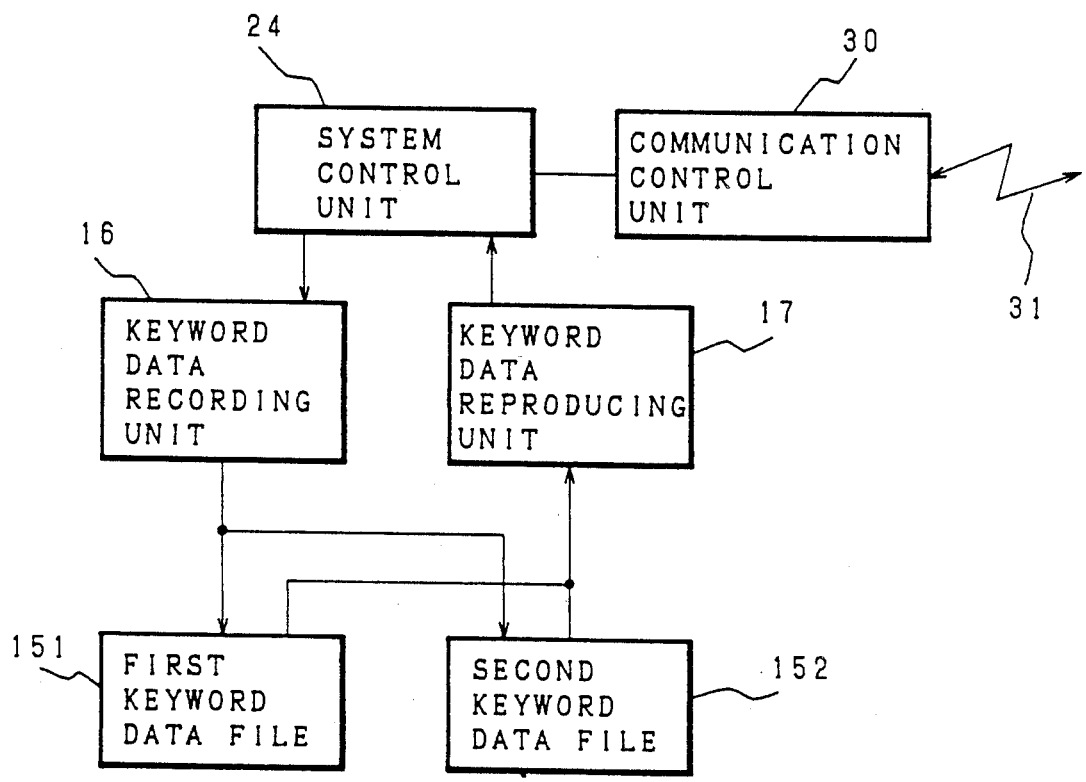
FIG. 16 is a partial block diagram showing an arrangement for communicating with other information filing apparatuses, and FIGS. 17(a) to (z) and (A) to (G) are schematic views of the display screen in a CRT display.

Finally, the function of communication in the information filing apparatus will be described. FIG. 16 is a block diagram of an arrangement including two of first and second keyword data files 151, 152 and a communication control unit 30 connected to an exterior circuit 31. According to the arrangement of the present invention, the first keyword data file 151 serves as a keyword data file and thus, is utilized in the same manner as set forth above. On the other hand, the second keyword data file 152 is adapted to store the data which are received from a keyword data file of the other information filing apparatus communicated with the present information filing apparatus.

The keywords stored in the second keyword data file 152 are available for input only when the second keyword input means is used. This allows the user to observe a list of keywords transferred from the other information filing apparatus with the information filing apparatus under his eyes and thus, read other image information registered in the other information filing apparatus with the present filing apparatus via the exterior circuit 31.

With this respect, the second keyword input means is only usable because relation between the keywords in the other information filing apparatus and the multiple item input equipment 8 of first keyword input means is unknown at the side of the apparatus under user's eyes.

As set forth above, the information filing apparatus according to the present invention offers the simple and smooth keyword input and also high workability because of automatically setting the retrieval item for each keyword by a multiple item input equipment. Additionally, the keywords can be input by selecting from the list of keywords displayed on the screen of a display when number of keyword increases.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An information filing apparatus comprising:
an image information storage means for storing a plurality of image information;
a keyword data storage means for storing data of a plurality of keywords;
a retrieval information storage means for storing storage location information of said image information stored in said image information storage means in correspondence to the data of keywords stored in said keyword data storage means;
a display means;
a first keyword input means including a multiple item input equipment having a plurality of keys generating code data by operation thereof and corresponding to at most all of the keywords whose data are stored in said keyword data storage means, a keyword location information storage means for storing information of the location of the keys on said multiple item input equipment in correspondence to data from said keyword data storage means, and a keyword location information converting unit for converting the code data supplied from said multiple item input equipment into keyword data according to the content of said keyword location information storage means, said first keyword input means enabling input of the keywords in correspondence to operation of the keys, said first keyword input means being operative independent of said display means for enabling said input of the keywords;
a second keyword input means including a keyword list display means for displaying on said display means a keyword list of the keywords whose data are stored in said keyword data storage means so as to enable inputting of the keyword when one of keywords is selected from the keyword list;
an image information retrieval means for retrieving the image information from said image information storage means based on the keyword inputted from said first or second keyword input means and the information stored in said retrieval information storage means; and an image information output means which reads out the image information retrieved by said image information retrieval means from said image information storage means to display said image information on said display means.

2. An information filing apparatus as set forth in claim 1, wherein the number of keywords that can be displayed by said keyword list display means are larger than the same that can be defined by said multiple item input equipment.

3. An information filing apparatus as set forth in claim 1, further comprising keyword display means for displaying on said display means the keywords inputted from said first or second keyword input means.

4. An information filing apparatus as set forth in claim 3, wherein the input of keywords from said first keyword input means is prohibited during the input of keywords by said second keyword input means.

5. An information filing apparatus as set forth in claim 3, wherein said keyword display means displays a selected one of said keywords in the keyword list during the input of keyword from said second keyword input means.

6. An information filing apparatus as set forth in claim 1, wherein the input of keywords from said first keyword input means is permitted during the input of keywords by said second keyword input means.

7. An information filing apparatus as set forth in claim 6, wherein said keyword display means deletes the keyword list displayed by said second keyword input means and then displays the keywords inputted from said first keyword input means as the keywords are inputted by said first keyword input means during input of keyword from said second keyword input means.

8. An information filing apparatus as set forth in claim 6, wherein as the keywords are inputted by said first keyword input means during the input of keywords from said second keyword input means, said keyword display means displays the keywords inputted from said first keyword input means at a location which differs from where the keyword list of said second keyword input means can be displayed by said display means.

9. An information filing apparatus as set forth in claim 1, wherein said retrieval information storage means retrieves image information by a plurality of retrieval items so that the inputted keywords are set without selection of retrieval item at the input of keyword by said first keyword input means, and the inputted keywords are set by selection of the designated retrieval item at the input of keyword by said second keyword input means.

10. An information filing apparatus as set forth in claim 9, wherein the keyword list displayed by said second keyword input means is displayed in multi-window form on said display.

11. An information filing apparatus as set forth in claim 1, further comprising keyword frequency storage means for counting the frequency of the keywords in use whose data are stored in said keyword data storage means, said keyword list display means displaying said keywords in the keyword list in an order which is in accordance with the content of said keyword frequency storage means.

12. An information filing apparatus as set forth in claim 11, wherein the determination of the order of the keyword arrangement by said keyword list display means is executed at each of the retrieval items.

13. An information filing apparatus as set forth in claim 11, wherein the storage contents of said keyword frequency storage means are displayed in the keyword list displayed by said second keyword input means.

14. An information filing apparatus as set forth in claim 1, wherein said keyword list display means indicates the keywords which are free of corresponding to said first keyword input means in the keyword list displayed by said second keyword input means.

15. An information filing apparatus as set forth in claim 14, wherein said keyword list display means indicates key location of said multiple item input equipment at the keywords that are in correspondence to said first keyword input means in the keyword list.

16. An information filing apparatus as set forth in claim 14, wherein said keyword list display means displays both groups of the keywords that are in correspondence with and free of correspondence with said first keyword input means separately in the keyword list.

17. An information filing apparatus as set forth in claim 14, wherein said keyword list display means displays the keywords that are free of correspondence with said first keyword input means.

18. An information filing apparatus as set forth in claim 1, further comprising a keyword retrieval means for retrieving keywords whose data are stored in said keyword data storage means.

19. An information filing apparatus as set forth in claim 1, further comprising a communication means for communicating with another information filing apparatus.

20. An information filing apparatus comprising:

an image information storage means for storing a plurality of image information;

a keyword data storage means for storing data of a plurality of keywords;

a retrieval information storage means for storing the storage location information of image information stored in said image information storage means in correspondence to the data of keywords stored in said keyword data storage means;

a display means;

a first keyword input means including a multiple item input equipment having a plurality of keys generating code data by operation thereof and corresponding to at most all of the keywords whose data are stored in said keyword data storage means, keyword location information storage means for storing information of the location of the keys on said multiple item input equipment in correspondence to the data from said keyword data storage means, and a keyword location information converting unit for converting the code data supplied from said multiple item input equipment into keyword data according to the content of said keyword location information storage means said first keyword input means enabling input of the keywords in correspondence to operation of the keys, said first keyword input means being operative independent of said display means for enabling said input of the keywords;

a second keyword input means including a keyword list display means for displaying on said display means a keyword list of the keywords whose data are stored in said keyword data storage means so as to enable inputting of the keyword when one of keywords is selected from the keyword list;

an image information retrieval means for retrieving the image information from said image information storage means based on the keyword inputted from said first or second keyword input means and the information stored in said retrieval information storage means;

an image information output means which reads out the image information retrieved by said image information retrieval means from said image information storage means to display said image information on said display means; and a keyword registration means for registering the keyword data of the keyword inputted from said first or second keyword input means to said keyword data storage means.

21. An information filing apparatus as set forth in claim 20, wherein the keyword data of the keywords selected from the keyword list displayed by said second keyword input means and the code data provided by operating the keys of said multiple item input equipment is stored in said keyword location information storage means in relation with each other.

22. An information filing apparatus as set forth in claim 1, further comprising:

means for displaying on said display means simultaneously two windows, each of said windows having a respective keyword list being displayed, one of said windows being displayed in response to selection of a corresponding keyword in the other of said windows by said second keyword input means; and means for displaying in response to said second keyword input means a selected one of said keywords of said keyword list of the other of said two windows also in said one of said two windows.

23. An information filing apparatus as set forth in claim 20, further comprising:

means for displaying on said display means simultaneously two windows, each of said windows having a respective keyword list being displayed, one of said windows being displayed in response to selection of a corresponding keyword in the other of said windows by said second keyword input means; and means for displaying in response to said second keyword input means a selected one of said keywords of said keyword list of the other of said two windows also in said one of said two windows.

* * * * *